(12) United States Patent
Bedier et al.

(10) Patent No.: US 11,829,980 B2
(45) Date of Patent: Nov. 28, 2023

(54) PAYMENT TERMINAL SYSTEM AND METHOD OF USE

(71) Applicant: Poynt LLC, Tempe, AZ (US)

(72) Inventors: Osama Bedier, Palo Alto, CA (US); Ray Tanaka, Palo Alto, CA (US); Robert Hernandez, Palo Alto, CA (US)

(73) Assignee: Poynt LLC, Tempe, AZ (US)

( * ) Notice: Subject to any disclaimer, the term of this patent is extended or adjusted under 35 U.S.C. 154(b) by 0 days.

(21) Appl. No.: 17/962,296

(22) Filed: Oct. 7, 2022

(65) Prior Publication Data

US 2023/0033432 A1 Feb. 2, 2023

Related U.S. Application Data

(63) Continuation of application No. 17/186,331, filed on Feb. 26, 2021, now Pat. No. 11,468,419, which is a
(Continued)

(51) Int. Cl.
| | |
|---|---|
| *G06Q 20/20* | (2012.01) |
| *G07G 1/00* | (2006.01) |
| *G06K 7/00* | (2006.01) |
| *G07G 1/01* | (2006.01) |
| *G06Q 20/04* | (2012.01) |
| *G06Q 20/38* | (2012.01) |

(Continued)

(52) U.S. Cl.
CPC ......... *G06Q 20/204* (2013.01); *G06K 7/0004* (2013.01); *G06Q 20/047* (2020.05); *G06Q 20/085* (2013.01); *G06Q 20/102* (2013.01); *G06Q 20/108* (2013.01); *G06Q 20/20* (2013.01); *G06Q 20/209* (2013.01); *G06Q 20/382* (2013.01); *G06Q 20/401* (2013.01); *G06Q 20/4016* (2013.01); *G07G 1/0009* (2013.01); *G07G 1/0018* (2013.01); *G07G 1/01* (2013.01); *G06F 3/041* (2013.01); *G06F 3/1423* (2013.01)

(58) Field of Classification Search
CPC .. G06Q 20/204; G06Q 20/047; G06Q 20/401; G06K 7/0004
USPC ......................................................... 705/17
See application file for complete search history.

(56) References Cited

U.S. PATENT DOCUMENTS

| | | | |
|---|---|---|---|
| 8,905,303 B1 * | 12/2014 | Ben Ayed | G06Q 20/401 235/375 |
| 11,468,419 B2 * | 10/2022 | Bedier | G06Q 20/401 |

(Continued)

*Primary Examiner* — Ahshik Kim
(74) *Attorney, Agent, or Firm* — GREENBERG TRAURIG, LLP

(57) ABSTRACT

A payment terminal, including: a display, an input device configured to generate input signals indicative of a user input, a payment instrument reader configured to receive payment instrument data from a financial payment instrument, a secure processor connected to the payment instrument reader, a main processor connected to the display, the main processor separate and distinct from the secure processor, a secure input processor connected to the input device and the secure processor, wherein the secure processor is operable between an unsecured mode, wherein the secure processor sends input coordinates based on the input signals received from the secure input processor to the main processor; and a secured mode, wherein the secure input processor ceases input coordinate forwarding to the main processor.

20 Claims, 10 Drawing Sheets

Related U.S. Application Data continuation of application No. 16/700,145, filed on Dec. 2, 2019, now Pat. No. 10,977,637, which is a continuation of application No. 16/119,072, filed on Aug. 31, 2018, now Pat. No. 10,528,934, which is a continuation of application No. 15/635,462, filed on Jun. 28, 2017, now Pat. No. 10,096,012, which is a continuation of application No. 14/743,356, filed on Jun. 18, 2015, now Pat. No. 9,721,247, which is a continuation of application No. 14/526,033, filed on Oct. 28, 2014, now Pat. No. 9,092,766.

(51) Int. Cl.
  *G06Q 20/08* (2012.01)
  *G06Q 20/10* (2012.01)
  *G06Q 20/40* (2012.01)
  G06F 3/041 (2006.01)
  G06F 3/14 (2006.01)

(56) References Cited

U.S. PATENT DOCUMENTS

2013/0254053 A1* 9/2013 Hayhow ............ G06Q 20/3829
  705/44
2014/0214665 A1* 7/2014 Lee ..................... G06Q 20/353
  705/41

* cited by examiner

PAYMENT TERMINAL SYSTEM AND METHOD OF USE

CROSS-REFERENCE TO RELATED APPLICATIONS

This application is a continuation of U.S. application Ser. No. 17/186,331, filed Feb. 26, 2021, issued as U.S. Pat. No. 11,468,419; which is a continuation of U.S. application Ser. No. 16/700,145, filed Dec. 2, 2019, issued as U.S. Pat. No. 10,977,637; which is a continuation of U.S. application Ser. No. 16/119,072, filed Aug. 31, 2018, issued as U.S. Pat. No. 10,528,934; which is a continuation of U.S. application Ser. No. 15/635,462, filed Jun. 28, 2017, issued as U.S. Pat. No. 10,096,012; which is a continuation of U.S. application Ser. No. 14/743,356, filed Jun. 18, 2015, issued as U.S. Pat. No. 9,721,247; which is a continuation of U.S. application Ser. No. 14/526,033, filed Oct. 28, 2014, issued as U.S. Pat. No. 9,092,766; each of which is incorporated by reference herein in its entirety.

TECHNICAL FIELD

This invention relates generally to the payment instruments field, and more specifically to a new and useful payment terminal in the payment instruments field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
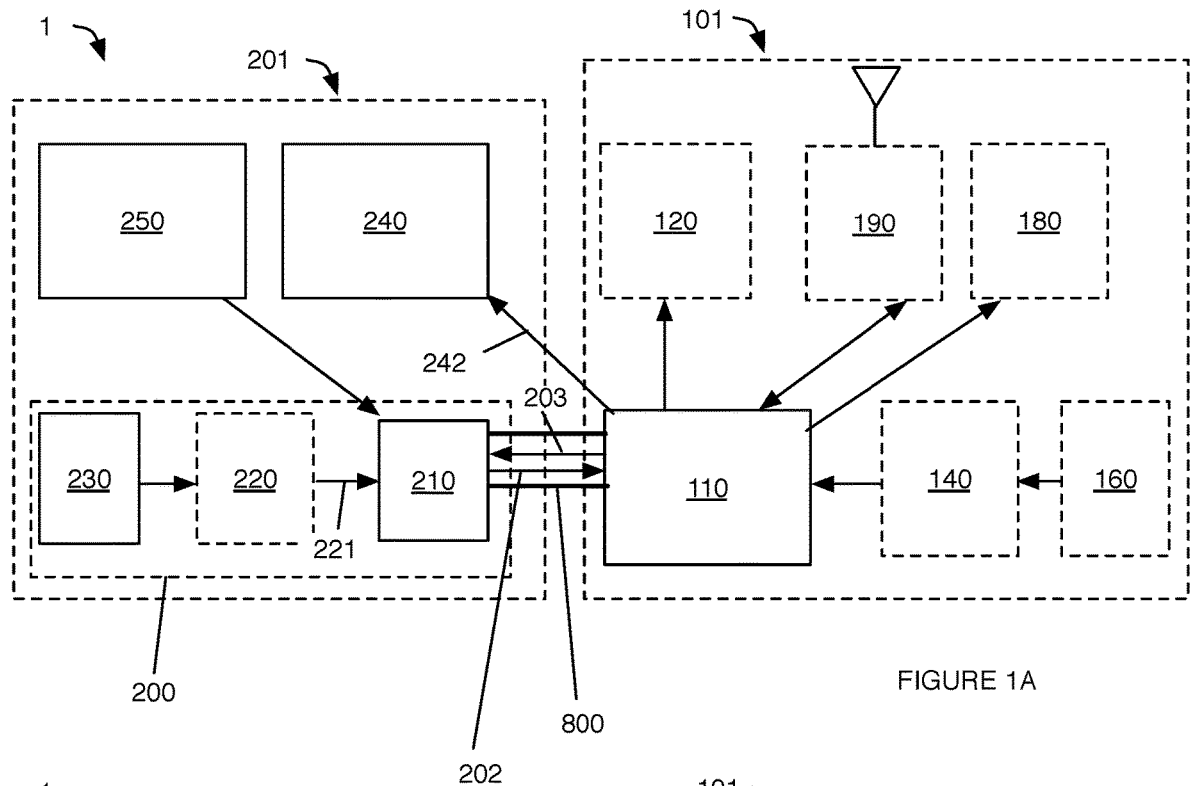
FIGS. 1A and 1B are schematic representations of the payment terminal in the secured and unsecured mode, respectively.
Figure 1B:
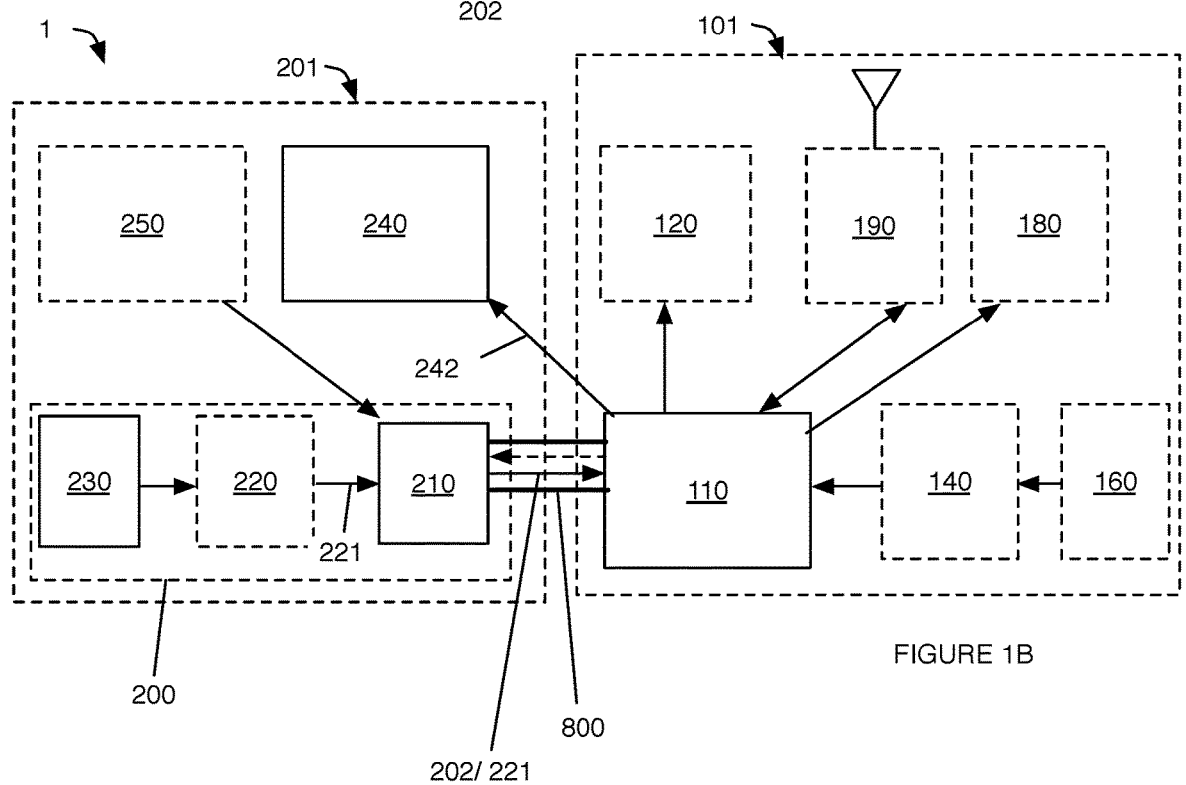

As shown in FIGS. 1A and 1B, the payment terminal 1 includes a secure display 240, a secure input device 230 associated with the secure display 240, a secure processor 210 connected to the secure input device 230, and a main processor 110, distinct from the secure processor 210, which is connected to the secure display 240. The payment terminal 1 functions to provide standard-compliant payment processing (e.g., PCI-complaint payment processing) while enabling access to the merchant-level information. In particular, the payment terminal 1 can function to receive and process payment information in a standard-compliant manner. The payment terminal 1 can additionally function to collect payment information associated with orders or transactions for the merchant. The payment terminal 1 can additionally function as a platform through which third party applications can access and/or process the payment information. The payment terminal 1 can additionally function to automatically determine a type of payment used by a customer, and initiate different consumer payment flows based on the payment type. The payment terminal 1 can additionally function to integrate non-secure payment methods (e.g., cash, payment instruments 50, rewards cards, etc.) into the same payment flow as secured payment methods. The payment terminal 1 can additionally function to interface with peripheral devices, such as legacy payment devices (e.g., pre-existing cash boxes, scanners, etc.), new payment devices, customer traffic trackers, or any other suitable peripheral device. The payment terminal 1 can additionally function to extract information from non-payment instruments, such as drivers licenses, QR codes, or any other suitable information source. Examples of extracted information use include: unique identification of a user for a non-transaction use (e.g., identity verification during voting or by police, loyalty account identification, coupon retrieval or application, etc.), advertising campaign planning, customer purchase prediction, customer traffic prediction, employee performance tracking, employee acquisition planning, automated loan application, automated credit verification, automated settlement, automated accounting, automated or semi-automated tax preparation, automated inventory ordering, automated sale recommendations, or any other suitable transaction-related business functionality.

1. Potential Benefits

This payment terminal 1 can confer several benefits over conventional systems. First, the payment terminal 1 enables application interaction with transaction data generated by conventional payment terminals 600 (e.g., data manipulation) by introducing a main processor 110. Second, the payment terminal 1 can alter the payment terminal user experience by introducing a customer-facing touchscreen display, such that the terminal 1 is no longer a merchant-only device. Introducing a customer-facing touchscreen display can additionally confer the benefit of enabling a dynamically adjustable interface. Third, the payment terminal 1 enables both desktop and mobile use by introducing wireless payment information communication and by forming a handle 310 from its component parts.

2. Auxiliary Systems and Components

The payment terminal 1 can be used with a payment instrument 50 that functions to store financial transaction information that functions as a payment authenticating piece used to carry out a financial transaction. The payment instrument 50 can be a payment card, a token, or any other suitable payment instrument. The payment card can be a credit card, debit card, gift card, fund transfer card, or any other suitable financial transaction card. The token can be a secure element, such as a secure element chip or a virtual element, an integrated circuit (e.g., an IC card, such as an EMV card), or any other suitable token.

The payment terminal 1 can receive, process, and transmit sensitive information and non-sensitive information. Sensitive information can be a set of information required to complete a financial transaction, access a confidential account, or any other suitable information. Examples of sensitive information can include the full payment instrument identifier (e.g., full credit card number), a PIN number, a verification code, a social security number, or any other suitable sensitive information. Non-sensitive information can be any information that is not considered sensitive. Examples of non-sensitive information can include the cart items, the transaction amount, the transaction time, the customer name or other identifier, issuer identifier, last four digits of a payment card identifier, or any other suitable non-sensitive information.

Transmitting information can include sending information, broadcasting information, or otherwise communicating information. Sending information can include passing the information to a limited, predetermined set of endpoints (e.g., a single endpoint) in a targeted manner (e.g., through a targeted distribution channel), wherein endpoints outside of the predetermined set do not receive the information. Broadcasting information can include sending the information or an event associated with the information to multiple endpoints (e.g., all endpoints) through a common distribution channel, such as by putting the information on a common bus. Any endpoint connected to the common distribution channel can subsequently receive and/or the information from the source. However, information can be otherwise transmitted from sources to endpoints.

The payment terminal 1 can function to generate or otherwise process order information. Order information can include transaction information, cart or product information (e.g., product identifier, number of each product, etc.), customer identifiers, merchant identifiers, employee identifiers, order status (e.g., completed, open, paid but not picked up, etc.), or any other suitable order information. Transaction information can include a transaction identifier, transaction amount, merchant information, customer identifier, payment type, terminal identifier, and/or any other suitable information about the transaction. The transaction identifier can be universally unique, unique to the merchant, unique to the customer identifier, generic, or be defined in any other suitable manner.

The payment terminal 1 can interact with a payment verification system (payment entity) that functions to verify payments or otherwise facilitate payment verification. The payment verification system can be the payment instrument 50 (e.g., the IC chip or secure element), a payment gateway, a payment processor, a financial service provider (e.g., a credit card provider, bank, etc.), or be any other suitable entity or system capable of verifying or facilitating verification of a payment.

Figure 7:
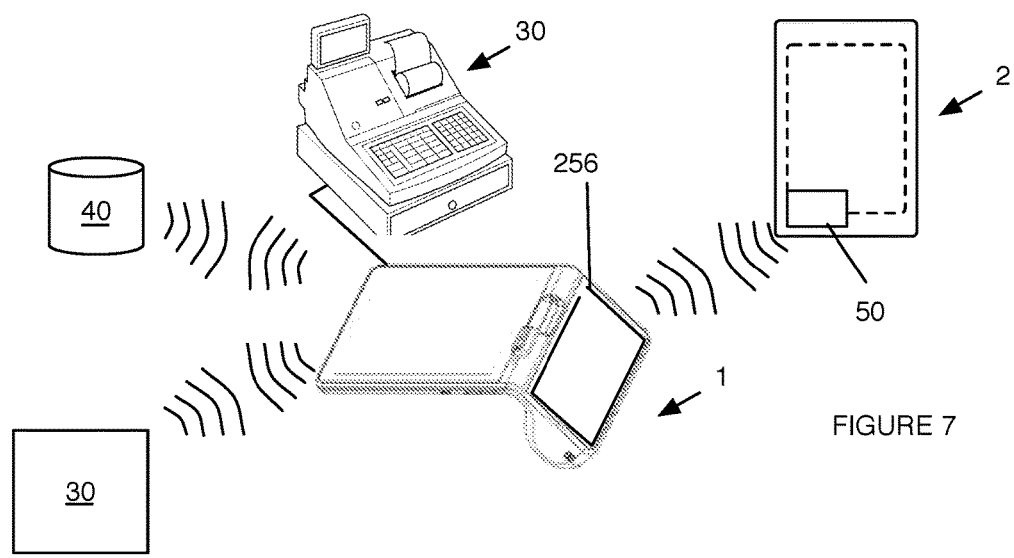
FIG. 7 is a schematic representation of a variation of the payment terminal interacting with peripheral devices, a remote system, and a user device with a wireless payment instrument.

As shown in FIG. 7, the payment terminal 1 can interact with a remote system 40 which functions to store merchant information. The remote system can additionally or alternatively function to facilitate payment verification, wherein the remote system can send secured payment information to the payment verification system. The secured payment information can be received from the payment terminal 1, or be automatically generated by the remote system. The merchant information can be sensitive information, non-sensitive information, or a combination thereof. The merchant information can include order information, transaction information, customer information, merchant account information, user account information for users associated with the merchant (e.g., employee accounts), permissions for user application access, permissions for application information access, permissions for order information access (e.g., authorization, authentication, etc.), terminal activation control, or any other suitable merchant information. The remote system can be a remote computing system or be any other suitable system. The payment terminal 1 can be connected to the remote system through a wired connection (e.g., LAN, cable, etc.) or wireless connection (e.g., WiFi, cellular, Bluetooth, etc.).

The payment terminal 1 can function to secure information. Securing information can include obfuscating information, encrypting information (e.g., using symmetric key encryption, public key encryption, etc.), or otherwise securing the information.

3. Payment Terminal Components and Variations

Figure 8:
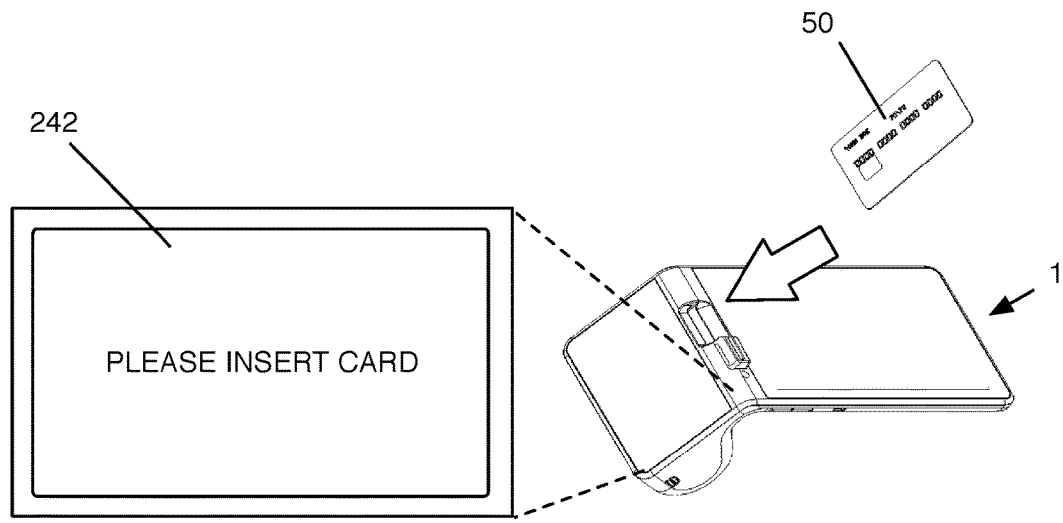
FIG. 8 is a schematic representation of a variation of the payment terminal displaying a display element and interacting with a payment card.

As shown in FIG. 8, the secure display 240 (customer display, first display) of the payment terminal 1 functions to display order information, user interface elements, targets, windows for user input receipt, or any other suitable image to a user. In some variations of the payment terminal 1 (e.g., those with a single display), the secure display 240 can additionally function as the merchant display, wherein the processor controlling secure display operation (e.g., the main processor 110) can dynamically shift secure display control between a first and second distinct kernel, switch operation modes between a secured and unsecured mode, or otherwise shift control of the secure display 240 based on user selections (e.g., a payment initiation selection) and/or information received at the secure processor 210 (e.g., payment instrument detection). The secure display 240 can be an LCD display, LED display, plasma display, OLED display, or any other suitable display. The secure display 240 can define a broad face having a longitudinal axis and lateral axis. The secure display 240 can be planar, curved, or have any other suitable broad face configuration. The secure display 240 can be substantially rectangular (e.g., square or with a length longer than a width), triangular, circular, or have any other suitable profile. The secure display 240 is preferably controlled by the main processor 110, but can alternatively be controlled by a processor that is separate and distinct from the main processor 110. The secure display 240 is preferably controlled by a secure display resource of the main processor 110, but can alternatively be controlled by a payment resource or any other suitable resource of the main processor no. In a specific example, the secure display 240 can only be controlled by the main processor no. However, the secure display 240 can be controlled by any other suitable component. The secure display 240 can be connected to the main processor 110 by a wired connection, such as a display cable, display bus, male/female connection (e.g., PCI express, etc.), MIPI, or any other suitable wired connection, or a wireless connection, such as Bluetooth, BLE, NFC, or any other suitable wireless communication system.

The secure input device 230 (customer input device, secure input, first input device) of the payment terminal 1 functions to receive a user input and convert the user input into input signals 231 (e.g., measurements) indicative of the user input. In some variations of the payment terminal 1 (e.g., those with a single display or input device), the secure input device 230 can additionally function as the merchant input device, wherein the processor controlling secure display operation (e.g., the secure input processor 220) can dynamically switch operation modes or otherwise shift operation based on user selections (e.g., a payment initiation selection) and/or information received at the secure processor 210 (e.g., payment instrument detection).

The secure input device 230 is preferably associated with the secure display 240, wherein the user input measurements generated by the secure input device 230 are translated into selection information based on the actual or anticipated image or interface (display element 242) concurrently displayed on the secure display 240 during measurement receipt. However, the secure input device 230 can be associated with any other suitable display.

The secure input device 230 is preferably connected to the secure processing system 200, more preferably the secure input processor 220 but alternatively the secure processor 210 or any other suitable processor. Alternatively or additionally, the secure input device 230 can be connected to the main processor 110, main input processor 140, or any other suitable processor. The secure input device 230 preferably only sends the measurements or other signals to the connected processor, but can alternatively or additionally send the measurements to any other suitable endpoint. The secure input device 230 can additionally be controlled by the connected processor, wherein the connected processor can control power provision to the secure input device 230, control or instruct the secure input device 230 to introduce signal noise into the measurement, or control or instruct the secure input device 230 to operate in any other suitable manner. The secure input device 230 can receive power directly from a power source 600, such as a charging port 630 or a power storage unit (e.g., battery), receive power indirectly from the power source 600 through the connected processor, or be powered in any suitable manner. The secure input device 230 can be connected to the secure processor 210 by a wired connection, such as a cable, bus, male/female connection, MIPI, or any other suitable wired connection, or a wireless connection, such as Bluetooth, BLE, NFC, or any other suitable wireless communication system.

The secure input device 230 is preferably operable in a single mode (e.g., a secured mode), but can alternatively operate between a secured mode and an unsecured mode, or between any other suitable set of modes. In the secured mode, the secure input device 230 can secure (e.g., obfuscate) the measurements sent to the secure input processor 220, secure processor 210, other component of the secure processing system 200, main processor 110, or any other suitable destination. In the unsecured mode, the secure input device 230 can send unsecured measurements to the secure input processor 220, secure processor 210, other component of the secure processing system 200, main processor no, or any other suitable destination. The secure input device operation mode can be controlled by the secure input processor 220, a separate and distinct processor or driver, or by any other suitable control system. The secure input device operation mode can be the same as (e.g., reflect) the connected processor operation mode, or can be independent of the connected processor operation mode.

The secure input device 230 can be a touchscreen 232, a pointing device, a keyboard, a sound input (e.g., a microphone), or any other suitable input device. The secure touchscreen can function to enable a user to interact directly with what is displayed on the secure display 240. The pointing device, keyboard, or other input devices can enable the user to interact indirectly with what is displayed on the secure display 240. The secure touchscreen is preferably overlaid over the secure display 240, such that touch coordinates registered by the secure touchscreen can be mapped to pixel sets, digital interaction elements, or other virtual targets displayed on the secure display 240. The secure touchscreen preferably has substantially the same dimensions as the secure display 240, but can alternatively be larger (e.g., extend over all or a portion of the display bezel) or smaller. The secure touchscreen preferably has a similar pixel density as the secure display 240, but can alternatively be denser (e.g., 3 times denser) or sparser. The secure touchscreen is preferably substantially aligned with the secure display 240, such that the touchscreen longitudinal axis and lateral axis are substantially aligned with the secure display 240 longitudinal axis and lateral axis. However, the secure touchscreen can be misaligned with the secure display 240 (e.g., with an offset central normal axis), or aligned in any other suitable orientation. The secure touchscreen can include a broad face, wherein the secure touchscreen broad face is substantially parallel the secure display broad face. Alternatively, the secure touchscreen can be arranged in any suitable configuration relative to the broad face.

The touchscreen can be a resistive touchscreen, surface acoustic wave touchscreen, capacitive touchscreen, infrared grid touchscreen, infrared acrylic projection touchscreen, optical imaging touchscreen, dispersive signal technology touchscreen, acoustic pulse recognition touchscreen, or utilize any other suitable touchscreen technology. Examples of capacitive touchscreens include a surface capacitance touchscreen, projected capacitance touchscreen, such as mutual capacitance touchscreen or self-capacitance touchscreen, or any other suitable capacitive touchscreen. In a specific example, the touchscreen is a PIN transaction security (PTS)-compliant and/or PIN encryption device (PED)-compliant touchscreen. The measurements or signals output by the touchscreen are preferably touch measurements, and can include the capacitance change for each of a plurality of touchscreen points, capacitor, or any other suitable measurement location. However, the measurements or signals can be determined from the position of a switch, a potential voltage magnitude, a change in the voltage magnitude, the current magnitude, the current frequency, or from any other suitable signal.

The touchscreen can include one or more layers. In one variation, the touchscreen includes a translucent top layer including a metallic coating along a first surface, an adhesive spacer proximal the first surface, a translucent bottom layer including metallic coating along a second surface proximal the first surface, and a translucent mounting layer. The touchscreen is preferably substantially transparent, but can alternatively have any other suitable translucidity. The top and bottom layers can be formed from the same materials or different materials. The top and/or bottom layers can be formed from polymer (e.g., polyester, PEG, etc.), glass, or any other suitable substrate material. The touchscreen can additionally include a polarizing filter that functions to limit the viewing angle, coupled along a second surface of the top layer opposing the first surface, the first surface of the top layer, the first or second surface of the bottom layer, along the broad face of the display proximal the touchscreen, or along any other suitable surface. The touchscreen can include a first broad face extending over the respective display broad face, more preferably proximal the display active surface but alternatively along any other suitable portion of the display.

The secure processor 210 of the payment terminal 1 functions to perform a predefined set of functionalities. The secure processor 210 can additionally function to determine whether received information includes sensitive information, separate the sensitive information from non-sensitive information, secure sensitive information, or otherwise process received information. Application interaction (e.g., reading, writing, editing, and/or deletion) from all or some of the memory and processes connected to or supported by the secure processor 210 is preferably limited to a predetermined set of main processor modules (e.g., standard-certified or compliant modules, such as the payment module), but can alternatively be entirely prevented or otherwise limited. The secure processor 210 can be dynamically updated (e.g., wherein the secure processor 210 receives encrypted update information from the main processor 110) or be otherwise adjusted in any other suitable manner. The secure processor 210 is preferably separate (e.g., forming or viewed as a unit apart or by itself) and distinct (e.g., recognizably different in nature) from the main processor 110, but can alternatively be separate from the main processor 110, distinct from the main processor 110, be a portion (e.g., a core) of the main processor 110, be a sub-processing module of a processor that also supports the main processor 110, or have any other suitable relation to the main processor 110. The secure processor 210 can be supported on a different chipset, different circuit board, different core, different kernel, different thread, or otherwise separated and/or distinguished from the main processor 110. The secure processor 210 can be standard-compliant, standard-certified, standard-signed, otherwise compliant with a payment industry security standard, or be non-compliant with industry standards. Examples of a payment card industry standard includes PCI DSS (Payment Card Industry Data Security Standard), PCI P2PE, PTS, or EMVCo, but any other suitable payment industry security standard can be used. The secure processor 210 can include or be associated with secure memory (e.g., volatile memory, non-volatile memory, etc.), wherein the secure memory can be separate and distinct, integrated with, or be the same as the main memory. The secure memory can store encryption keys, coordinate maps (e.g., for input coordinate interpretation when the terminal is in the secured mode), firmware, certificates, or any other suitable information. The secure memory can be read only, write only, read/write, or have any other suitable functionality.

The secure processor 210 can be connected to the secure input device 230, wherein the secure processor 210 can receive information from the secure input device 230. In one variation, the secure processor 210 can be indirectly connected to the secure input device 230 through an intermediary processor, such as a secure input processor 220 (e.g., secure touch processor). In this variation, the received information can include a set of input coordinates (e.g., touch coordinates, selection coordinates). The set of input coordinates can be determined from the measurements (e.g., input signals) by the intermediary processor, or otherwise determined. The set of input coordinates can be secured or unsecured (e.g., by the intermediary processor or secure input device 230). However, the received information can additionally or alternatively include any other suitable information. In this variation, the secure processor 210 can be selectively operatively connected to the secure input device 230 by the intermediary processor or continuously operatively connected to the secure input device 230 by the intermediary processor. The secure processor 210 can receive secure input device information (e.g., input signals, input coordinates, etc.) from the intermediary processor when operatively connected to the secure input device 230, and cannot receive secure input device information from the intermediary processor when not operatively connected to the secure input device 230. The secure processor 210 can be prevented from receiving secure input device information when not operatively connected to the secure input device 230, or simply not sent secure input device information by the intermediary processor. The secure processor 210 can be virtually prevented from receiving the secure input device information, such as by implementing a firewall or virtually disconnecting the secure processor 210 from the secure input device 230, physically prevented from receiving the secure input device information, such as by disconnecting the secure processor 210 from the secure input device 230 (e.g., by changing the state of a switch), or otherwise prevented from receiving secure input device information.

In a second variation, the secure processor 210 can be directly connected to the secure input device 230. In this variation, the received information can include all or a portion of the measurements from the secure input device 230. However, the secure processor 210 can be otherwise connected to and receive information from the secure input device 230.

The secure processor 210 can additionally be connected to the payment hardware 250. The secure processor 210 can be directly connected to the payment hardware 250, indirectly connected to the payment hardware 250 (e.g., through a secure financial information processor, in a similar manner to indirect secure processor connection with the secure input device 230, as discussed above), or otherwise connected to the payment hardware 250. When the terminal 1 includes a secure financial transaction processor, the secure financial information processor can receive information (e.g., payment instrument data or information, identification information, etc.) from the payment hardware 250, determine whether the information is sensitive, and send the information to the secure processor 210 in response to the financial information being sensitive information, and to the main processor 110 in response to the financial information being non-sensitive information. Alternatively, these functionalities can be performed by the secure processor. The secure financial transaction processor can be operable only in the secured mode, or can be operable between a secured mode and an unsecured mode, or operate between any suitable set of operation modes. However, the secure financial transaction processor can operate in any other suitable manner. The secure financial transaction processor can be separate and/or distinct from the secure processor 210, integrated with the secure processor 210, integrated with the main processor 110, or otherwise configured.

The secure processor 210 can be operatively connected to the payment hardware 250, or be otherwise connected. When the secure processor 210 is operatively connected to the payment hardware 250, the secure processor 210 can receive all or a portion of the information determined by the payment hardware 250. The secure processor 210 can additionally or alternatively control payment hardware operation when operatively connected to the payment hardware 250. The secure processor 210 is preferably continuously operatively connected to the payment hardware 250, but can alternatively be selectively operatively connected to the payment hardware 250 (e.g., by an intermediary payment hardware 250 processor), only connected to the payment hardware 250 by a power connection, or otherwise connected to the payment hardware 250.

The secure processor 210 can additionally be connected to the main processor 110. The secure processor 210 can be directly connected to the main processor 110, indirectly connected to the main processor 110 (e.g., in a similar manner to indirect secure processor connection with the secure input device 230, as discussed above), or otherwise connected to the main processor 110. The secure processor 210 can be operatively connected to the main processor 110, or be otherwise connected. When the secure processor 210 is operatively connected to the main processor 110, the secure processor 210 can only send information 202 (e.g., data) to the main processor 110. Alternatively, the secure processor 210 can only receive information from the main processor 110 when operatively connected. Alternatively, the secure processor 210 can both send and receive information to and from the main processor no when operatively connected. Alternatively, the secure processor 210 can be limited to only receiving information from the main processor 110 when operatively connected to the main processor no. The secure processor 210 is preferably continuously operatively connected to the main processor 110, but can alternatively be selectively operatively connected to the main processor 110, only connected to the main processor 110 by a power connection, or otherwise connected to the main processor 110.

The secure processor 210 is preferably connected to the main processor no by a single connection 800, but can alternatively be connected to the main processor 110 by multiple connections. The connection Boo preferably includes both power and data connections, but can alternatively only include a power or data connection. The connection can be a two-way connection (e.g., send data to and from both endpoints), or be a one-way connection (single-direction connection, e.g., only transmit data in one direction from a source to a destination), or be any other suitable type of connection. The connection Boo is preferably a physical connection, such as a wire, bus, or board-to-board connection, but can alternatively be a wireless connection, such as a short-range data connection (e.g., NFC, Bluetooth, BLE, RF, IR, etc.) or long-range data connection (e.g., WiFi, Zigbee, Z-wave, etc.), or be any other suitable connection. In a specific example, the connection can be a USB connector, FireWire connector, or any other suitable wired connector. The connection Boo can additionally include a hardware security module, be formed from optical fiber, be configured to sever in response to physical tampering, or be secured in any other suitable manner. In one variation of the payment terminal 1, the secure processor 210 only outputs information to the main processor 110, and otherwise only received inputs from other terminal components. In a second variation of the payment terminal 1, the secure processor 210 can output information (e.g., control information, etc.) to other terminal components. The connector preferably extends across the junction, but can alternatively extend along any other suitable portion of the terminal 1.

The secure processor 210 preferably operates in a single mode, more preferably the secured mode, but can alternatively operate between a secured mode and an unsecured mode, or between any other suitable set of modes. In the secured mode, the secure processor 210 can secure (e.g., encrypt, obfuscate, etc.) all information output by the secure processor 210 (output information), a subset of the output information (e.g., only information determined to be secure information, such as information satisfying a condition indicative of sensitive information, etc.), or any other suitable portion of the output information. In the unsecured mode, the secure processor 210 can output (e.g., send, transmit, broadcast, etc.) unsecured output information. When the secure processor 210 is operable between a set of operation modes, the secure processor operation mode is preferably controlled by the secure processor 210 but can alternatively be controlled by the main processor 110 or by any other suitable control system.

The secure processor 210 is preferably arranged proximal the secure display 240, but can alternatively be arranged proximal the main display 120, proximal the secure input device 230, proximal the main input device 160, or arranged in any other suitable location. The secure processor 210 is preferably arranged with a broad face substantially parallel the respective display broad face, but can alternatively be arranged in any suitable orientation. The secure processor 210 can be substantially centered with the respective display, offset from the respective display, be arranged proximal an end of the respective display (e.g., along the display longitudinal axis), or otherwise arranged.

Figure 9:
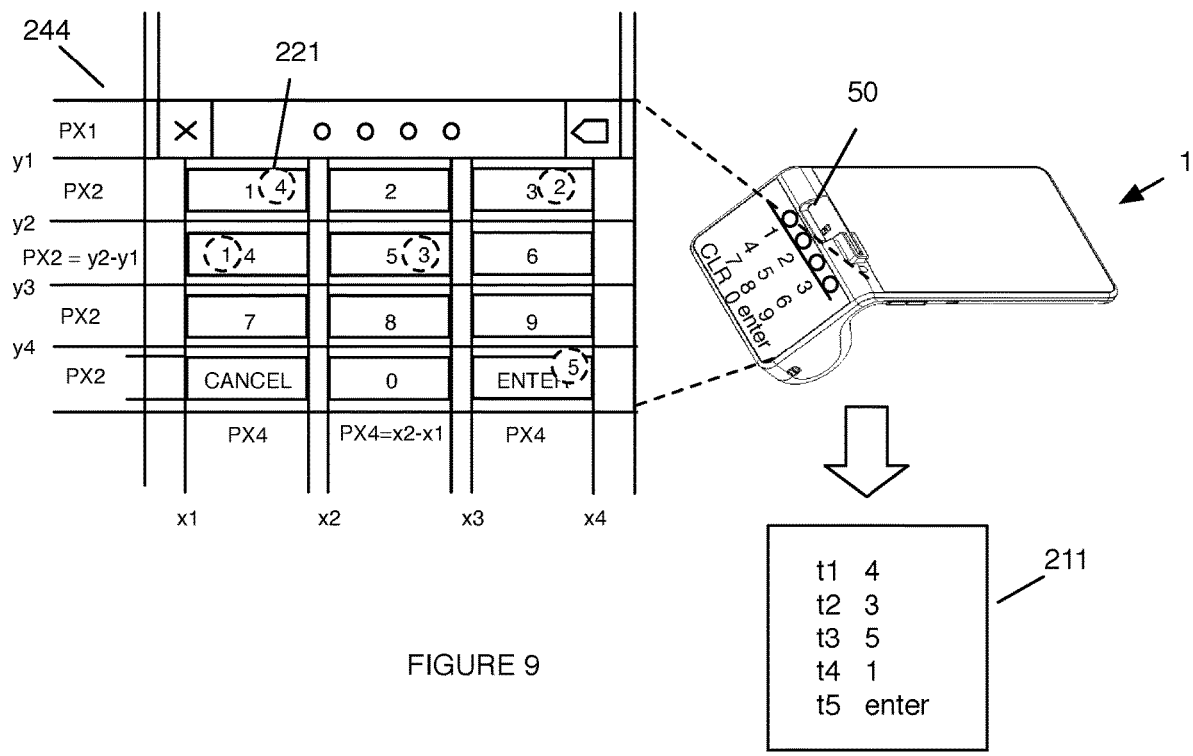
FIG. 9 is a schematic representation of a variation of the payment terminal interpreting input coordinates in light of a coordinate map.

The secure input processor 220 (first input processor) of the payment terminal 1 functions to interpret measurements determined at the secure input device 230 into secure reference coordinates. The reference coordinates 221 can be input coordinates (e.g., touchscreen coordinates), display coordinates, or any other suitable reference point that can subsequently be used to determine a user selection with reference to the image or interface concurrently displayed on the secure display 240 during measurement registration. In a specific example, the user selection can be determined based on a coordinate map 244 associated with the concurrently displayed image or interface, as shown in FIG. 9. However, the user selection can be determined in any other suitable manner. The secure input processor 220 can be connected to the secure input device 230, wherein the secure input processor 220 can receive information from the secure input device 230 only (e.g., through a one-way connection), both send and receive information to and from the secure input device 230 (e.g., control information, etc. through a two-way connection), send information to the secure input device 230 only, or be otherwise operatively connected to the secure input device 230. The secure input processor 220 can be connected to the secure input device 230 by a wired connection, such as a cable, bus, male/female connection, or any other suitable wired connection, or a wireless connection, such as Bluetooth, BLE, NFC, or any other suitable wireless communication system. The secure input processor 220 can be can be standard-compliant, standard-certified, standard-signed, otherwise compliant with a payment industry security standard, or be non-compliant with industry standards.

In one variation, the secure input processor 220 is a secure touch processor that functions to convert touch signals (e.g., changes in capacitance) to the reference coordinates 221. In another variation, the secure input processor 220 is a secure device processor that functions to determine a virtual pointer position relative to the image concurrently displayed on the secure display 240. However, the secure input processor 220 can be any other suitable input processor.

The secure input processor 220 can additionally function to secure the reference coordinates 221, or any other suitable information output by the secure input processor 220. The secure input processor 220 can secure all information output by the secure input processor 220, secure output information only when operating in the secure mode, or secure information based on any other suitable operation parameter.

The secure input processor 220 can additionally function to selectively determine the endpoint for the reference coordinates 221. The secure input processor 220 is preferably operable between a secured and an unsecured mode, but can alternatively be operable only in the secured mode, in the unsecured mode, or between any suitable set of operation modes. The secure input processor operation mode is preferably independent of the secure processor 210 (e.g., even when the secure input processor 220 is an integral module of the secure processor 210), but can alternatively be the same as the secure processor operation mode. The secure input processor operation mode is preferably determined (and/or controlled) by the secure input processor itself, but can alternatively be determined by the secure processor 210, the main processor 110, or any other suitable component.

In the secured mode, the secure input processor 220 is preferably operatively connected to and sends reference coordinates to the secure processor 210, but can alternatively send the reference coordinates 221 to any other suitable endpoint. In a first variation, the secure input processor 220 operating in the secured mode broadcasts the reference coordinates 221 to all connected endpoints. In this variation, the secure input processor 220 can encrypt the reference coordinates 221 prior to broadcasting, wherein only endpoints with the decryption key (e.g., the secure processor 210) can read the information. In a second variation, the secure input processor 220 operating in the secured mode only sends the reference points to the endpoints that are operatively connected to the secure input processor 220. In this variation, the secure input processor 220 can selectively operatively connect or disconnect different endpoints, such that only the secured processor can be operatively connected to the secure input processor 220 operating in the unsecured mode, both the secure and main processor 110 can be concurrently operatively connected to the secure input processor 220 operating in the unsecured mode, or any suitable endpoint can be operatively connected to the secure input processor 220 operating in the secured mode. In a specific example of the payment terminal 1, the secure input processor 220, operating in the secured mode, only sends the reference coordinates 221 to the secure processor 210, and does not send the reference coordinates 221 to the main processor 110. In this example, the secure processor 210 can be operatively connected to the secure input processor 220 and the main processor 110 can be operatively disconnected from the secure input processor 220. However, the secure input processor 220 can operate in any suitable manner while in the secured mode.

In the unsecured mode, the secure input processor 220 is preferably operatively connected to and sends reference coordinates to the main processor 110, but can alternatively send the reference coordinates 221 to any other suitable endpoint. In a first variation, the secure input processor 220 operating in the unsecured mode broadcasts the reference coordinates 221 to all connected endpoints. In a second variation, the secure input processor 220 operating in the unsecured mode only sends the reference points to the endpoints that are operatively connected to the secure input processor 220. In the second variation, only the main processor 110 can be operatively connected to the secure input processor 220 operating in the unsecured mode, both the secure and main processor 110 can be concurrently operatively connected to the secure input processor 220 operating in the unsecured mode, or any suitable endpoint can be operatively connected to the secure input processor 220 operating in the unsecured mode. In a specific example of the payment terminal 1, the secure input processor 220, operating in the unsecured mode, only sends the reference coordinates 221 to the main processor 110, and does not send the reference coordinates 221 to the secure processor 210. In this example, the main processor no can be operatively connected to the secure input processor 220 and the secure processor 210 can be operatively disconnected from the secure input processor 220. However, the secure input processor 220 can operate in any suitable manner while in the unsecured mode.

The secure input processor 220 or secure processor 210 is preferably operable between the secured and unsecured modes in response to a secure event and/or an unsecure event. The secure input processor 220 can operate in the secured mode in response to detection of the secure event or the absence of the unsecure event, and can operate in the unsecured mode in response to detection of the unsecure event or the absence of the secure event. The secure event can include payment initiation notification 203 receipt, payment initiation notification activation (e.g., received from the main processor 110), secure information collection notification (e.g., received from the secure processor 210 in response to detection of secure information from the payment hardware 250 or determination that secure information is to be collected), notification that a secure user interaction flow is being initiated (e.g., notification that a payment flow has been initiated), request for a PIN entry (e.g., determined based on the payment instrument or based on the payment amount, wherein the payment amount exceeds a threshold amount), or any other suitable event indicative of a need for the secure processor 210 to receive reference coordinates. The unsecure event can include payment initiation notification deactivation, notification that a secure user interaction flow is being ended (e.g., notification that a payment flow has been ended), or any other suitable event indicative of a need for the main processor 110 to receive reference coordinates, or the end of the need for the secure processor 210 to receive reference coordinates. The secure input processor 220 or secure processor 210 can operate in the unsecured mode by default, and switch to secure mode operation in response to determination of the secure event. Alternatively, the secure input processor 220 or secure processor 210 can operate in the secured mode by default, and switch to unsecured mode operation in response to determination of the unsecure event.

The secure input processor 220 is preferably a separate and distinct processor from the secure processor 210, but can alternatively be integrated into the same circuit board, chipset, kernel, thread, or be a module of the secure processor 210. However, the secure input processor 220 can be otherwise configured. In a first variation, the secure input processor 220 can be only connected to the secure processor 210, wherein the secure processor is operable between the secured and unsecured mode and selectively forwards reference coordinates to the main processor. In a second variation wherein the secure input processor 220 is separate and distinct from the secure processor 210, the secure input processor 220 can be connected to both the main processor 110 and the secure processor 210. The secure input processor 220 can be only operatively connected to the secure processor 210 in the secure mode, and only operatively connected to the main processor 110 in the unsecured mode, but can be otherwise connected. The secure input processor 220 can be connected to the secure processor 210 by a wired connection, such as a cable, bus, male/female connection, or any other suitable wired connection, or a wireless connection, such as Bluetooth, BLE, NFC, or any other suitable wireless communication system. In a third variation wherein the secure input processor 220 is integrated with the secure processor 210, the secure input processor 220 can be always operatively connected to the secure processor 210, wherein the secure processor 210 can be selectively operatively connected to the main processor 110 between the secured and unsecured modes, or selectively secure information sent to the main processor 110 between the secured and unsecured modes. In a fourth variation, the secure input processor 220 can be a separate and distinct processor from the secure processor 210, but be only connected to the secure processor 210, wherein the secure processor 210 can determine and/or selectively secure input device information (e.g., reference coordinates) to pass to the main processor 110. In this variation, the terminal 1 can include a secure processing system 200 that includes the secure processor 210, secure input processor 220, and/or secure financial transaction processor. However, the secure input processor 220 can be connected to processing endpoints and operate in any other suitable manner.

The secure input processor 220 is preferably arranged proximal the secure processor 210, but can alternatively be arranged proximal the secure display 240, main display 120, secure input device 230, main input device 160, or arranged in any other suitable location. The secure input processor 220 is preferably arranged with a broad face substantially coplanar with a secure processor broad face, but can alternatively be arranged with the broad face parallel the secure processor 210 broad face, parallel the respective display broad face, or arranged in any other suitable orientation.

The main processor 110 of the payment terminal 1 functions as the main computing system of the payment terminal 1. The main processor 110 can be a CPU, set of CPUs or any other suitable processing system. The main processor 110 is preferably separate and distinct from the secure processor 210 or any other suitable component of the secure processing system 200, but can alternatively be integrated with the secure processor 210 or secure processing system 200. The main processor 110 can include or be associated with main memory (e.g., volatile memory, non-volatile memory, etc.), wherein the main memory can be separate and distinct, integrated with, or be the same as the secure memory. The main memory can function to store and/or support applications, display elements, transaction or order information, permissions, or any other suitable piece of information. The main memory can be read only, write only, read/write, or have any other suitable functionality.

The main processor 110 is preferably arranged proximal the main display 120, but can alternatively be arranged proximal the secure display 240, proximal the main input device 160, proximal the secure input device 230, or arranged in any other suitable location. The main processor 110 is preferably arranged with a broad face substantially parallel the display broad face, but can alternatively be arranged in any suitable orientation. The main processor 110 is preferably arranged proximal an end of the respective display (e.g., along the display longitudinal axis), but can alternatively be substantially centered with the respective display or otherwise arranged. In one variation, the main processor 110 can be arranged proximal the connector of the main display, proximal the junction, or arranged in any other suitable location.

The main processor 110 of the payment terminal 1 functions to control the secure display 240. In one example of main processor secure display control, the main processor 110 can control which images or interfaces are displayed on the secure display 240. In a second example of main processor secure device control, the main processor 110 can polarize or otherwise limit the visual angle of the images displayed on the device during sensitive information entry or display, wherein sensitive information entry or display can be associated with a predetermined subset of images (e.g., PIN number entry, social security number display, cart item list, signature screen, welcome screen, etc.). A distinct resource on the main processor 110 preferably controls the secure display 240, but the secure display 240 can be controlled by any other suitable portion of the main processor 110. The distinct resource can be secured or unsecured, and can be standard-compliant, standard-certified, standard-signed, otherwise compliant with a payment industry security standard, or be non-compliant with industry standards.

The main processor 110 can additionally or alternatively function to receive information from the secure input processor 220, and process the reference coordinates 221 into user interface elements, alphanumeric characters, or other functional information 211. The main processor 110 preferably processes the reference coordinates 221 into functional information using a coordinate map 244 associated with the image displayed concurrently with user input receipt (e.g., the image that was displayed at the timestamp associated with the measurements), but can alternatively process the reference coordinates 221 in any other suitable manner.

The main processor 110 can additionally or alternatively function to control a main display 120, a main input device 160, a printer 500, a power source boo, one or more wireless communication modules 190, one or more sensors 400, indicators, memory, and/or any other suitable component. The main processor 110 is preferably connected, more preferably continuously or selectively operatively connected to the respective component, but can alternatively otherwise control the component.

The main processor no can additionally or alternatively function to store and execute applications (e.g., native applications, browser applications, etc.), wherein the applications can substantially freely read, write, edit, and/or delete from all or some of the memory and processes connected to or supported by the main processor no. The main processor 110 can additionally or alternatively function to process payments, generate payment initiation notifications, and/or control the payment flow. The main processor no can additionally or alternatively function to receive secured information from the secure processor 210, and send the secured information to the remote system 40 and/or payment gateway. The main processor no can additionally or alternatively function to receive, store, and/or communicate unsecured information from the secure processor 210 to a remote system. The main processor 110 can additionally function to generate or determine process flow events, such as payment initiation events, transaction completion events, or any other suitable event, and can additionally extract non-sensitive information from the events. The main processor 110 can additionally function to interface (e.g., send or receive information) with a remote system.

The payment terminal 1 can additionally include a main display 120 (second display) that functions to display application data (e.g., third party application data, native application data, etc.), browser data, or any other suitable data. The main display 120 is preferably a merchant display (e.g., intended for the merchant to view and interact with information), but can alternatively be used by the customer. The displayed information is preferably non-sensitive data, but can alternatively or additionally be sensitive data. The main display 120 can be a LCD display, LED display, plasma display, OLED display, or any other suitable display. The main display 120 can define a broad face having a longitudinal axis and lateral axis. The main display 120 can be planar, curved, or have any other suitable broad face configuration. The main display 120 can be substantially rectangular (e.g., square or with a length longer than a width), triangular, circular, or have any other suitable profile. The main display 120 is preferably larger than the secure display 240, but can alternatively be substantially the same size or smaller. In a specific variation, the main display 120 is approximately three times the size of the secure display 240.

The main display 120 is preferably connected to the main processor 110, but can alternatively be connected to any other suitable component. The main display 120 is preferably controlled by only the main processor no (i.e., operatively connected to the main processor no), but can alternatively or additionally be controlled by any other suitable component. The main display 120 can be connected to the main processor 110 by a wired connection, such as a display cable, display bus, male/female connection (e.g., PCI express, etc.), or any other suitable wired connection, or a wireless connection, such as Bluetooth, BLE, NFC, or any other suitable wireless communication system.

The main display 120 is preferably mounted to the secure display 240, but can alternatively be separate and distinct from the secure display 240 (e.g., located on a separate system). In a first variation, the main display 120 is statically mounted to the secure display 240. The main display 120 is preferably statically mounted to the secure display 240 at an obtuse angle (e.g., at 120°, 150°, etc.) but can alternatively be mounted to the secure display 240 at an acute angle (e.g., 0°, 30°, 45°, 60°), a normal angle (e.g., 90°), mounted coplanar to the secure display 240, or mounted to the secure display 240 at any other suitable orientation. The main display 120 is preferably mounted to the secure display 240 with the respective display active surfaces oriented away from (e.g., distal) each other, but can alternatively be mounted to the secure display 240 with the respective active surfaces toward (proximal) each other, with the respective active surfaces directed in the same direction, or arranged in any other suitable configuration. The main display 120 and secure display 240 are preferably coupled with the respective orientation vectors 80 directed away from each other (e.g., in a mutually opposing orientation, separated by the coupling angle, etc.), but can alternatively be coupled with the respective orientation vectors directed toward each other, arranged in parallel and directed in the same direction, or arranged in any other suitable orientation. A first edge of the main display 120 is preferably joined to a first edge of the secure display 240, but the secure display 240 can alternatively be joined to the body of the main display 120 (e.g., to the back face opposing the active surface 122, between a first and second opposing edge) or the main display 120 can alternatively be joined to the body of the secure display 240. However, the main display 120 and secure display 240 can be joined along any other suitable portion of the respective displays.

In a first specific example, a lateral edge of the main display 120 can be joined to a longitudinal edge of the secure display 240. In this example, the orientation vector of the main display 120 can be substantially parallel the respective longitudinal edge, and the orientation vector of the secure display 240 can be substantially parallel the respective lateral edge. In a second specific example, a lateral edge of the secure display 240 can be joined to a longitudinal edge of the main display 120. In this example, the orientation vector of the secure display 240 can be substantially parallel the respective longitudinal edge, and the orientation vector of the main display 120 can be substantially parallel the respective lateral edge. However, the orientation vectors can be otherwise configured. In a third specific example, a longitudinal edge of the main display 120 can be joined to a longitudinal edge of the secure display 240. In this example, the orientation vectors of the main display 120 and secure display 240 can be substantially parallel the respective longitudinal edges. In a fourth specific example, a longitudinal edge of the main display 120 can be joined to a longitudinal edge of the secure display 240, wherein the orientation vectors of the main display 120 and secure display 240 can be substantially perpendicular the respective longitudinal edges. In a fifth specific example, a lateral edge of the main display 120 can be joined to a lateral edge of the secure display 240, wherein the orientation vectors of the main display 120 and secure display 240 can be substantially perpendicular the respective lateral edges.

Figure 20A:
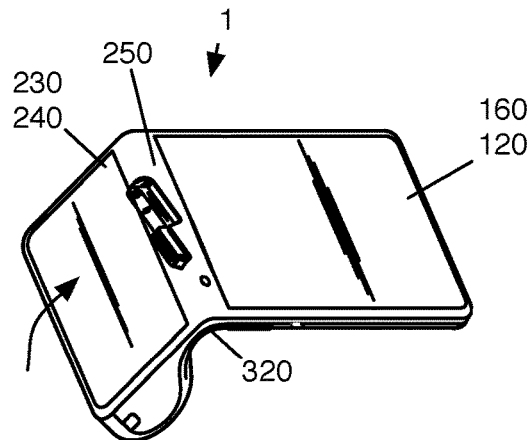
FIGS. 20A and 20B are schematic representations of a variation of the payment terminal including a secure side that rotates about a rotational axis parallel to the junction in a first and second position, respectively.
Figure 20B:
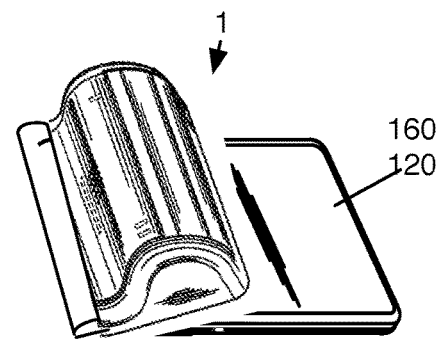
Figure 21A:
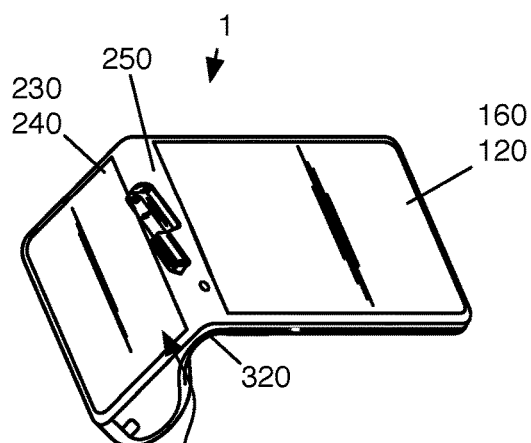
FIGS. 21A and 21B are schematic representations of a variation of the payment terminal including a secure side that rotates about a rotational axis perpendicular to the junction in a first and second position, respectively.
Figure 21B:
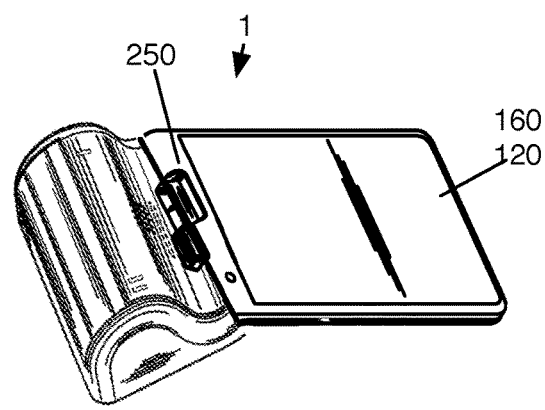

In a second variation, the secure display 240 can be translationally mounted to the main display 120. The secure display 240 preferably rotates relative to the main display 120 about a rotational axis, but can alternatively slide laterally or longitudinally along a translational axis, or translate relative to the main display 120 in any other suitable manner. The rotational axis is preferably parallel to the junction 320 between the secure display 240 and the main display 120 (e.g., extend along the junction 320, be offset from the junction 320), as shown in FIGS. 20A and 20B, but can alternatively be perpendicular to the junction 320 between the main display 120 and secure display 240, as shown in FIGS. 21A and 21B, or be positioned at any suitable angle relative to the junction 320.

The payment terminal 1 can additionally include a main input device 160 (second input device), which functions to receive a user input and convert the user input into measurements indicative of the user input. The main input device 160 is preferably associated with the main display 120, wherein the user input measurements generated by the main input device 160 are translated into selection information based on the actual or anticipated image or interface concurrently displayed on the main display 120 during measurement receipt. However, the main input device 160 can be associated with any other suitable display. The main input device 160 is preferably substantially similar to the secure input device 230, but can alternatively be any other suitable input device, as disclosed above.

The main input device 160 is preferably connected to the main processor 110, but can alternatively be connected to a main input processor 140 (which, in turn, can be connected to the main processor no), the secure processor 210, the secure input processor 220, or any other suitable processor. The main input device 160 preferably only sends the measurements or other signals to the connected processor, but can alternatively or additionally send the measurements to any other suitable endpoint. The main input device 160 can additionally be controlled by the connected processor, wherein the connected processor can control power provision to the main input device 160, control or instruct the main input device 160 to introduce signal noise into the measurement, or control or instruct the main input device 160 to operate in any other suitable manner. The main input device 160 can receive power directly from a power source 600, such as a charging port 630 or a power storage unit (e.g., battery), receive power indirectly from the power source 600 through the connected processor, or be powered in any suitable manner. The main input device 160 can be connected to the respective processor by a wired connection, such as a cable, bus, male/female connection, or any other suitable wired connection, or a wireless connection, such as Bluetooth, BLE, NFC, or any other suitable wireless communication system.

The main input device 160 is preferably operable in a single mode (e.g., an unsecured mode), but can alternatively be operable between a secured mode and an unsecured mode, or between any other suitable a set of modes. In one variation of the payment terminal 1, the main input device 160 can register measurements in the unsecured mode, and can be turned off (e.g., disconnected from power), switched into a standby mode, or otherwise prevented from registering measurements in the secured mode.

The main input device 160 can be a touchscreen, a pointing device, a keyboard, a sound input (e.g., a microphone), or any other suitable input device. The main touchscreen 162 can function to enable a user to interact directly with what is displayed on the main display 120. The pointing device, keyboard, or other input devices can enable the user to interact indirectly with what is displayed on the main display 120. The main touchscreen is preferably overlaid over the main display 120, such that touch coordinates determined by the main touchscreen can be mapped to pixel sets, digital interaction elements, or other virtual targets displayed on the main display 120. However, the main touchscreen can be arranged in any other suitable position relative to the main display 120. The main touchscreen preferably has substantially the same dimensions as the main display 120, but can alternatively be larger (e.g., extend over all or a portion of the display bezel) or smaller. The main touchscreen is preferably substantially aligned with the main display 120, such that the main touchscreen longitudinal axis and lateral axis are substantially aligned with the main display 120 longitudinal axis and lateral axis. However, the main touchscreen can be misaligned with the main display 120 (e.g., with an offset central normal axis), or aligned in any other suitable orientation. The main touchscreen can include a broad face, wherein the main touchscreen broad face is substantially parallel the main display broad face. Alternatively, the main touchscreen can be arranged in any suitable configuration relative to the broad face. The main touchscreen is preferably substantially similar to the secure touchscreen, but can alternatively be any other suitable touchscreen, as disclosed above.

The payment terminal 1 can additionally include a main input processor 140 (second input processor) that functions to interpret measurements registered by the main input device 160 into main reference coordinates. The reference coordinates 221 can be input coordinates (e.g., touchscreen coordinates), display coordinates, or any other suitable reference point that can subsequently be used to determine a user selection with reference to the image or interface concurrently displayed on the main display 120 during measurement registration. In a specific example, the user selection can be determined based on a coordinate map 244 associated with the concurrently displayed image or interface. However, the user selection can be determined in any other suitable manner.

The main input processor 140 can be connected to the main input device 160, wherein the main input processor 140 can receive information from the main input device 160 only (e.g., through a one-way connection), both send and receive information to and from the main input device 160 (e.g., control information, etc. through a two-way connection), send information to the main input device 160 only, or be otherwise operatively connected to the main input device 160. The main input processor 140 can be connected to the main input device 160 by a wired connection, such as a cable, bus, male/female connection, or any other suitable wired connection, or a wireless connection, such as Bluetooth, BLE, NFC, or any other suitable wireless communication system.

In one variation, the main input processor 140 is a main touch processor that functions to convert touch signals (e.g., changes in capacitance) to the reference coordinates 221. In another variation, the main input processor 140 is a main device processor that functions to determine a virtual pointer position relative to the image concurrently displayed on the main display 120. However, the main input processor 140 can be any other suitable input processor.

The main input processor 140 is preferably operable in a single mode (e.g., an unsecured mode), but can alternatively be operable between an unsecured and secured mode, or between any other suitable set of modes. In the unsecured mode, the main input processor 140 preferably sends unsecured main reference coordinates, determined from the main input device 160 measurements, to the main processor 110. However, the main input processor 140 can send the main reference coordinates to the secure processor 210 or to any other suitable endpoint in the unsecured mode. In the secured mode, the main input processor 140 can be turned off, switched to a standby mode, or otherwise prevented from processing (e.g., interpreting) measurements in the secured mode. The main input processor 140 preferably operates in the secured mode in response to secure processor operation in the secured mode, but can alternatively operate in the secured mode independently of secure processor operation, such as in response to payment initiation determination, payment instrument 50 coupling to the payment hardware 250, or in response to any other suitable event.

The main input processor 140 is preferably a separate and distinct processor from the main processor 110, but can alternatively be integrated into the same circuit board, chipset, kernel, thread, or be a module of the main processor 110. However, the main input processor 140 can be otherwise configured. The main input processor 140 can be connected to the main processor 110 by a wired connection, such as a cable, bus, male/female connection, or any other suitable wired connection, or a wireless connection, such as Bluetooth, BLE, NFC, or any other suitable wireless communication system. The main input processor 140 can alternatively be integrated with the main processor 110. However, the main input processor 140 can be connected to processing endpoints and operate in any other suitable manner.

The main input processor 140 is preferably arranged proximal the main processor no, but can alternatively be arranged proximal the secure display 240, main display 120, secure input device 230, main input device 160, or arranged in any other suitable location. The main input processor 140 is preferably arranged with a broad face substantially coplanar with a main processor broad face, but can alternatively be arranged with the broad face parallel the main processor broad face, parallel the respective display broad face, or arranged in any suitable orientation.

The payment terminal 1 can additionally include a set of payment hardware 250 (financial transaction information inputs, payment reader, payment instrument reader) that function to receive payment information from a financial payment instrument, such as a credit card, debit card, mobile device, token, or secure element. The payment hardware 250 can additionally function to receive auxiliary information from other information sources. For example, the payment hardware 250 can receive information from any card including a magnetic stripe, IC chip, NFC transmitter 256, barcode, QR code, Bluetooth, BLE, image, or any other suitable informational token.

The payment hardware 250 can be a card reader (e.g., payment card reader), a secure element transceiver, a camera, scanner, short-range communication transceiver, or any other suitable information input. The card reader can be a magnetic stripe reader, an IC chip reader 254, or any other suitable reader capable of extracting information from a card. The card reader preferably includes a body and a card opening (card aperture) configured to receive an inserted card. The payment hardware 250 can be a single-system reader capable of extracting information from a single type of information storage (e.g., a magnetic stripe reader), or can be a hybrid-system reader capable of extracting information from multiple types of information storage.

In a first variation, the payment hardware 250 can be a hybrid-system card reader including a magnetic stripe reader and an IC chip reader 254. The magnetic stripe reader can be a 3-track head reader, a 2-track head reader, or any other suitable reader. The integrated circuit (IC) chip reader can include a set of contacts, a contactless reader, or any other suitable IC chip reader 254. In a specific example, the hybrid-system card reader includes a body defining a card opening, wherein the card opening has a longitudinal axis extending along its length. The magnetic stripe reader can be arranged along a first longitudinal edge of the card opening, proximal an end of the card opening longitudinal axis, wherein the first longitudinal edge extends along a first broad face of the body. The IC chip reader 254 can be arranged proximal a first end of the body opposing the card opening, along a second broad face of the body opposing the first broad face.

The hybrid card reader 252 can additionally include a switch 257 arranged at the first end of the body. The switch can be configured to be operable in a coupled mode in response to card coupling with the switch (e.g., indicating full card insertion), and in an uncoupled mode when a card is not coupled to the switch. The switch can be coupled to the secure processor (e.g., wherein the secure processor can generate an event indicative of card coupling), an insertion confirmation output, such as a light or microphone, wherein the insertion confirmation output operation state (e.g., output light or sound) can be dependent on the switch operation state. The switch can additionally be connected to the secure processor 210 or payment hardware 250, wherein the secure processor 210 or payment hardware 250 can read information from the card in response to switch operation in the coupled mode. However, the hybrid card reader 252 or payment hardware 250 can include any other suitable payment instrument coupling indicator.

In one example of hybrid card reader operation, the connected processor (e.g., the secure processor 210) can dynamically determine the payment information storage types available on an inserted card. In response to substantially or near-real time determination that the card includes an IC chip, the connected processor can instruct the main processor 110 to display instructions associated with IC chip payment flow (e.g., to display instructions to leave the card in, to display a PIN pad, etc.). In response to substantially or near-real time determination that the card does not include an IC chip but does include a magnetic stripe, the connected processor can instruct the main processor 110 to display instructions associated with magnetic stripe payment flow, wherein the connected processor can control the magnetic stripe reader of the hybrid card reader 252 to read the magnetic stripe during card extraction from the card reader.

In a second variation, the payment hardware 250 can include an NFC transceiver configured to facilitate NFC payment information transfer between an NFC payment instrument and the payment terminal 1. The NFC transceiver can include an antenna, wherein the antenna can extend along all or a portion of the secure display 240, secure input device 230, or along any other suitable portion of the payment terminal 1. The antenna can be arranged in the same plane as the respective display, behind the display (e.g., distal the input device), or arranged in any other suitable location.

The payment hardware 250 can define a reference plane. The reference plane can be a broad face of a card reader body or chassis, a plane of the card reader opening, a plane of antenna winding, a plane extending in parallel to the longitudinal axis of an antenna, a plane extending perpendicular an antenna or coil central axis, or any other suitable plane. However, the payment hardware 250 can define a longitudinal axis or any other suitable reference point.

A payment hardware 250 can be arranged with the respective reference plane or point extending along a side of the secure display 240 (e.g., at a non-zero angle to the display broad face), an edge of the secure display broad face, a side of the main display 120, an edge of the main display broad face, or arranged in any other suitable location on the payment terminal 1. The payment hardware 250 can be arranged with the respective reference plane or point extending along a lateral edge, lateral side, longitudinal edge, or longitudinal side of the respective display. Alternatively, the payment hardware 250 can be arranged with the respective reference plane extending along a broad face of the respective display. Alternatively, the payment hardware 250 can be separate from the payment terminal 1. The payment hardware 250 is preferably arranged proximal the secure display 240 and/or secure input device 230, but can alternatively be arranged proximal the main display 120 and/or main input device 160 in variations of the payment terminal 1 including such components.

In a first example of payment hardware arrangement, the payment terminal 1 can include a housing 300 joining an edge of a secure display 240 and an edge of a main display 120 with a junction 320. The payment hardware 250 can be a card reader, wherein the card opening can be arranged along the junction 320, with the card opening longitudinal axis extending in parallel with the display edges joined by the junction 320. The card reader body can be arranged with a broad face substantially parallel the secure display broad face, substantially parallel the main display broad face, or at any other suitable angle relative to the main display or secure display broad faces.

In a second example of payment hardware arrangement, the payment hardware 250 can be a card reader, wherein the card opening can be arranged along a side of a secure display 240 or main display 120, with the card reader body substantially parallel to the respective display broad face. The card reader can be arranged with the opening extending along a lateral side or longitudinal side. The display can include an orientation vector (e.g., wherein text or other objects displayed on the displayed are aligned relative to the orientation vector), wherein the opening can be arranged along the right side of the display, the left side of display, the upper side of the display, or the lower side of the display.

In a third example of payment hardware arrangement, the payment hardware 250 can include an antenna. The antenna can be arranged within the housing 300 or along the housing exterior. The antenna can extend along a side of a secure display 240 or main display 120, along an edge of the respective display broad face, or along a junction 320 between the secure display 240 and main display 120, or along any other suitable portion of the payment terminal 1. The antenna can be substantially coplanar with the respective display, or offset from the respective display.

The payment terminal 1 can include one or more pieces of payment hardware 250. When the payment terminal 1 includes multiple payment hardware 250, the payment hardware 250 are preferably not redundant, but can alternatively be redundant and have multiple readers for a single information storage type (e.g., multiple IC chip readers 254). When the payment terminal 1 includes multiple payment hardware 250, the payment hardware 250 can be arranged at one or more of the aforementioned locations (e.g., colocalized or dispersed).

The payment hardware 250 is preferably connected to the secure processor 210, but can alternatively be connected to a secure financial information processor, the main processor 110, and/or any other suitable processor. The payment hardware 250 can be operatively connected to only the secure processor 210, only the main processor 110, both the main and secure processors 210, or to any other suitable component. The connection between the payment hardware 250 and the endpoint is preferably a one-way connection, wherein the payment hardware 250 can only send and not receive information, but can alternatively be a two-way connection or any suitable connection. The connection is preferably wired, but can alternatively be wireless. The payment hardware 250 can be powered through the connection, or can be powered through a separate power connection. The payment hardware 250 is preferably continuously operatively connected to the endpoint, but can be selectively operatively connected to the endpoint or connected in any other suitable manner.

Figure 13:
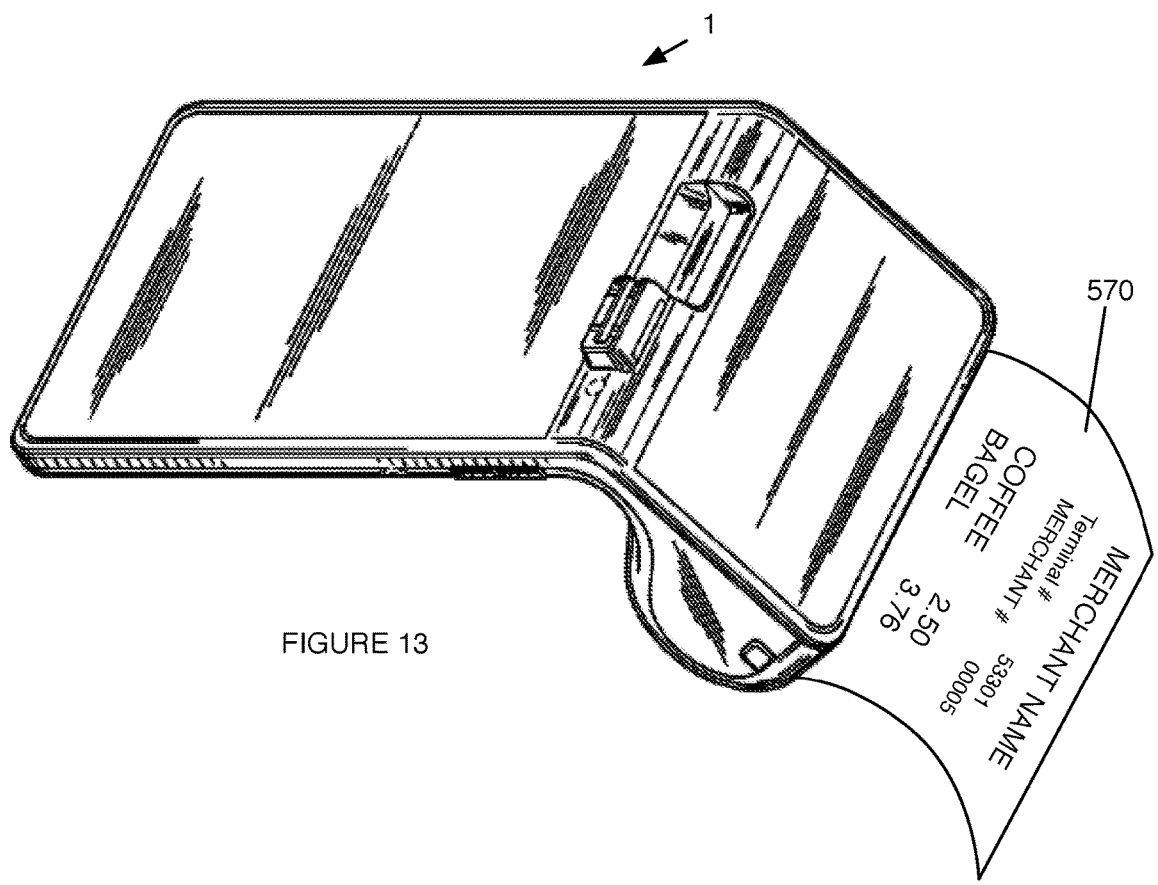
FIG. 13 is a schematic representation of a variation of the payment terminal including a printer dispensing printed substrate.

The payment terminal 1 can additionally include a printer 500 that functions to print information on a substrate 570, as shown in FIG. 13. The processor is preferably controlled by the main processor 110, but can alternatively be controlled by any other suitable processor. The printer 500 can include a printer body 510, a printer door 540, and a print mechanism. The printer 500 can be operable between a high voltage mode wherein the printer 500 prints at full speed, and a low voltage mode wherein the printer 500 prints at partial speed (e.g., based on a baud rate sent by the main processor to the printer). In a specific variation, the number of times the printer 500 can print in the high voltage mode is limited when the payment terminal 1 is disconnected from a high-voltage power source boo (e.g., a charging dock), wherein the printer 500 operation switches to the low voltage mode after the threshold number has been reached. However, the printer 500 can operate in any other suitable manner.

Figure 12:
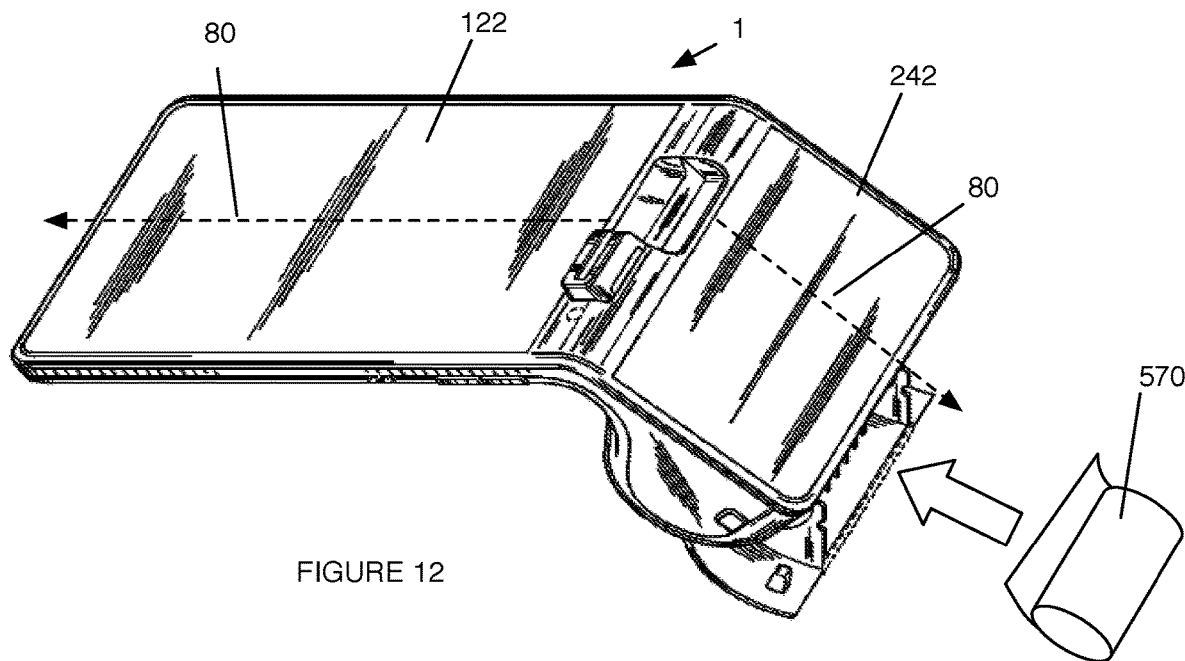
FIG. 12 an isometric view of a variation of the payment terminal including a printer interacting with printing substrate, wherein the printer door is in an open configuration.

The printer body 510 of the printer 500 can define a printing substrate receptacle having a printer opening 520, wherein a printing substrate storage mechanism (e.g., a paper roll) can be inserted through the printer opening 520 into the printing substrate receptacle, as shown in FIG. 12. The printing substrate receptacle can include a set of tracks, a set of grooves, a set of dimples, or any other suitable insertion guidance and/or substrate retention mechanism. The retention mechanism can additionally be configured to permit substrate dispensation (e.g., rotation about a dispensation axis). The printer opening 520 can include a first and second opposing edge, wherein the opposing edges can be parallel or have any other suitable relation. The printer body 510 preferably traces the shape of the substrate storage mechanism, but can alternatively have any other suitable shape. In one variation of the printer 500, the printer body 510 includes an arcuate surface.

The printer door 540 of the printer 500 functions to substantially seal the printer opening 520, and is operable between an open position and a closed position. In the printer opening 520 is preferably unobstructed when the printer door 540 is in the open position, and is preferably partially or substantially entirely obstructed when the printer door 540 is in the closed position. However, the printer door 540 can be operable between any other suitable set of positions, and can interact with the printer opening 520 in any other suitable manner. The printer door 540 preferably matches the profile of the printer body 510 (e.g., includes substantially the same curvature), but can alternatively have a different profile. The printer door 540 preferably has substantially the same dimensions as the printer opening 520, but can alternatively be smaller or larger.

The printer door 540 is preferably movably connected to the printer body 510, but can be otherwise coupled to the printer body 510. The printer door 540 is preferably connected to a first edge of the printer opening 520, more preferably a first longitudinal edge 530 of the printer opening 520, but can alternatively be connected to a first lateral edge of the printer opening 520 or be connected to any other suitable portion of the printer body 510. A printer door 540 longitudinal edge is preferably connected to the printer body 510, but a printer door 540 lateral edge, corner, or broad face can alternatively be connected to the printer body 510. The printer door 540 connector is preferably a hinge 580, such that the printer door 540 can actuate about a rotational axis substantially parallel to the first longitudinal edge of the printer opening 520 or printer door 540, but can alternatively be a slot, clip, set of tracks (e.g., wherein the printer door 540 slides along the printer body 510 in a direction substantially perpendicular the first longitudinal edge or slides along the printer body 510 in a direction substantially parallel the first longitudinal edge, etc.), or be any other suitable actuatable coupling mechanism.

The print mechanism of the printer 500 functions to create a substantially persistent human or computer-readable representation of graphics (e.g., QR codes) or text on the printing substrate 570. The printer mechanism 590 is preferably arranged distal the first longitudinal edge of the printer opening 520 (e.g., such that the printed image is distal the first longitudinal edge), but can alternatively be arranged proximal the first longitudinal edge of the printer opening 520 or arranged in any other suitable position. The print mechanism can be a toner-based, liquid inkjet, solid ink, dye-sublimation, thermal, laser, or any other suitable printing mechanism.

The printer 500 can additionally include a substrate gap 550 through which the printing substrate can be dispensed (e.g., from the printer 500 interior to the printer 500 exterior). In one variation, the substrate gap 550 can be cooperatively defined between the printer door 540 and the printer body 510. In this variation, the printer door 540 can be slightly smaller than the printer opening 520 along a lateral axis, such that the printer door 540 leaves a gap between the printer opening 520 longitudinal edge and the printer door 540 longitudinal edge when the printer door 540 is in the closed position. However, the printer door 540 can have any other suitable dimensions. The gap is can be defined substantially parallel the retention mechanism support axis (e.g., the substrate storage winding axis), defined parallel a longitudinal axis of the arcuate surface, or extend along any other suitable portion of the printer 500. The gap is preferably at least as wide as, if not longer than, the substrate width, but can alternatively be equal or shorter. The gap is preferably defined along the second edge of the printer opening 520 and/or printer door 540 opposing the connection edge, but can alternatively be defined along an edge adjacent the connection edge, be defined as an aperture through the printer door 540 body, or be defined in any other suitable manner.

The printer 500 can additionally include a substrate separation mechanism 560 that functions to separate a first portion of the substrate from the remainder of the substrate stored in the substrate storage mechanism. The substrate separation mechanism 560 can be a toothed mechanism that functions to perforate and facilitate substrate tearing, a shearing mechanism, or any other suitable separation mechanism 560. The printer 500 can include a first and second set of toothed mechanisms arranged along the first and second edges of the gap, respectively (e.g., second edges of the printer door 540 and printer opening 520, respectively), such that the substrate can be separated by applying force in a first or second direction, wherein the first and second directions can be at an angle to the longitudinal axes of the first and second toothed mechanisms, respectively. However, the printer 500 can include a single set of toothed mechanisms arranged along the edge of the printer door 540 or the printer opening 520, or include any suitable number of substrate separation mechanisms 560 arranged in any other suitable location.

The printer 500 is preferably coupled to the main display 120 or secure display 240, such that the respective display and printer 500 are housed in a singular housing 300. However, the printer 500 can be housed in a separate and distinct housing from the main display 120 or main housing. The printer 500 can be arranged along the edge of the respective display active surface, along the side of the respective display, along the edge of the respective display back surface (surface opposing the active surface), along the body of the respective display back surface, or along any suitable portion of the respective display. In one example of the payment terminal 1, the printer 500 coupled along a portion of the secure display back surface. In a specific example, the printer 500 can be coupled along the secure display back surface, proximal a secure display edge distal the junction 320 between the secure display 240 and main display 120. The printer 500 can occupy the entirety of the secure display back surface or a portion thereof. In the latter instance, the printer body 510 can cooperatively form a void with the connected display and second display, wherein the void defined along the respective display back surface between the printer body 510 and the joined second display functions as a hand support (e.g., cradle). However, the printer 500 can be arranged in any other suitable location (e.g., coupled to any other suitable portion of any other suitable component) of the payment terminal 1. The printer body 510 can additionally define a contact surface 340 distal the respective display and substantially parallel the longitudinal axis, wherein the contact surface 340 can be configured to support the respective display at a predetermined angle upon a supporting surface 10, such as a table.

Figure 6:
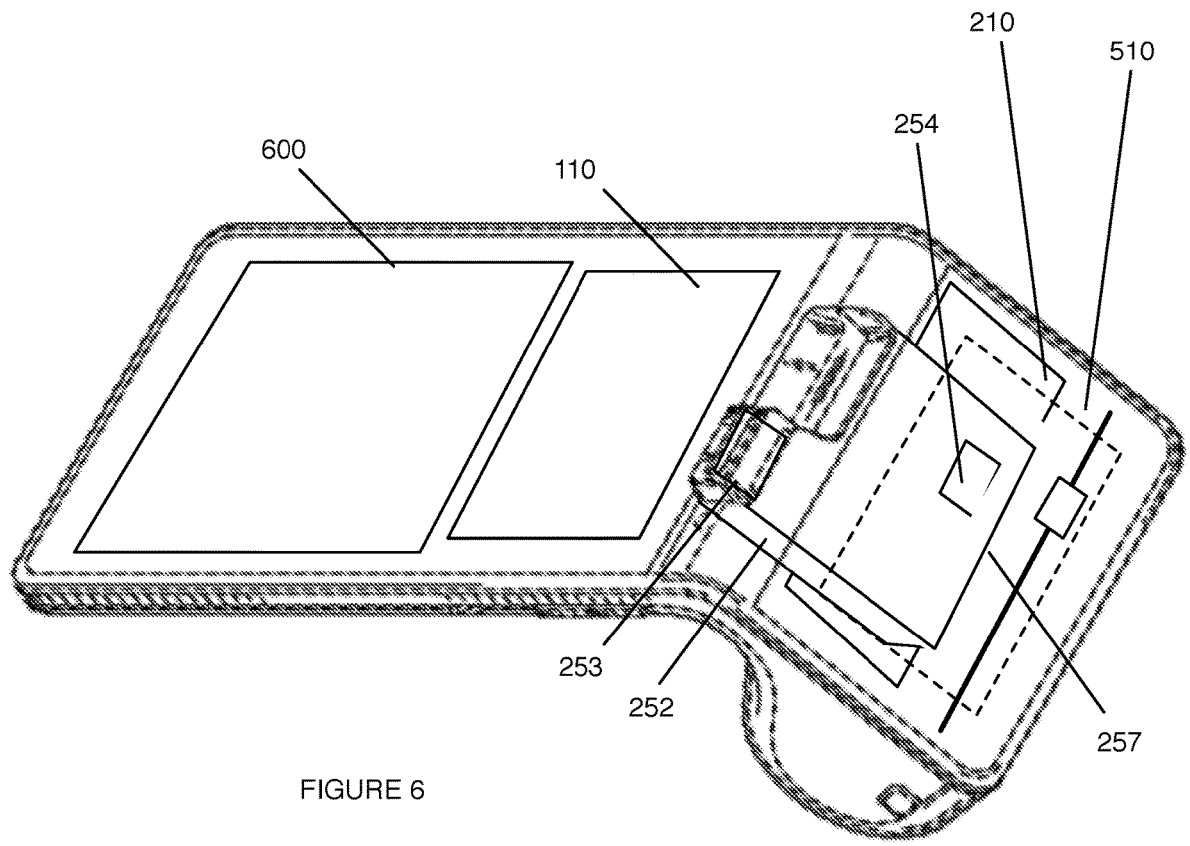
FIG. 6 is an exposed wireframe view of a variation of the payment terminal.

The payment terminal 1 can additionally include a power source 600 that functions to provide electrical power. The power source 600 can be a power storage unit, wireless power system (e.g., inductive charging system, RF power system, etc.), renewable power system (e.g., solar, wind, piezoelectric, etc.), or any other suitable power source 600. The power storage unit can function to store electrical power, receive electrical power, convert electrical power to power suitable for the payment terminal components, and/or otherwise interact with electrical power. The power storage unit is preferably a battery, more preferably a secondary battery but alternatively a primary battery, but can alternatively be a fuel cell system (e.g., wherein power is stored in a chemical form), or any other suitable power storage unit. The secondary battery can have lithium chemistry (e.g., be lithium ion, lithium polymer, etc.), nickel cadmium chemistry, magnesium chemistry, or any other suitable chemical composition. The power supply unit can be arranged proximal the main display 120, the secure display 240, or in any other suitable location. The power supply unit can be arranged with a power supply unit broad face substantially parallel the display broad face, wherein the power supply unit is preferably arranged proximal the display back surface. In a specific example in which the payment terminal 1 include a main display 120 joined to the secure display 240 along a junction 320, the power supply unit can be arranged substantially parallel one of the displays, proximal an end of the respective display distal the junction 320, as shown in FIG. 6. This can assist with weight distribution. In one variation of the payment terminal, the mass of the battery is preferably offset by the mass of the printer across the junction. However, the weight distribution between the secure side and main side can be 50/50, 40/60, 30/70, 70/30, 60/40, or have any other suitable distribution. However, the power supply unit can be arranged in any other suitable location within the payment terminal 1. The power supply unit can have a capacity of several thousand mA/h (e.g., 5,000 mA/h, 1,000 mA/h, 10,000 mA/h, etc.), several hundred mA/h (e.g., 500 mA/h, 100 mA/h, etc.), or any other suitable capacity. However, any other suitable power supply unit can be used. The power supply unit can include one or more battery cells. The power terminal can include one or more power supply units, no power supply units (e.g., wherein the power terminal can be powered on mains power), or any suitable number of power supply units.

The power source 600 is preferably electrically connected to all powered components of the payment terminal 1, such as the secure processor 210, secure display 240, secure input device 230, secure input processor 220, and main processor 110, and the main display 120, main input display, printer 500, sensors 400, communication modules 190, and/or any other suitable component, if included. The power source 600 can be directly connected to the payment terminal components, but can alternatively be indirectly connected to the payment terminal components (e.g., wherein an intermediary component receives the power from the power source 600 and sends the power to the endpoint component). However, power can be provided in any other suitable manner.

Figure 11:
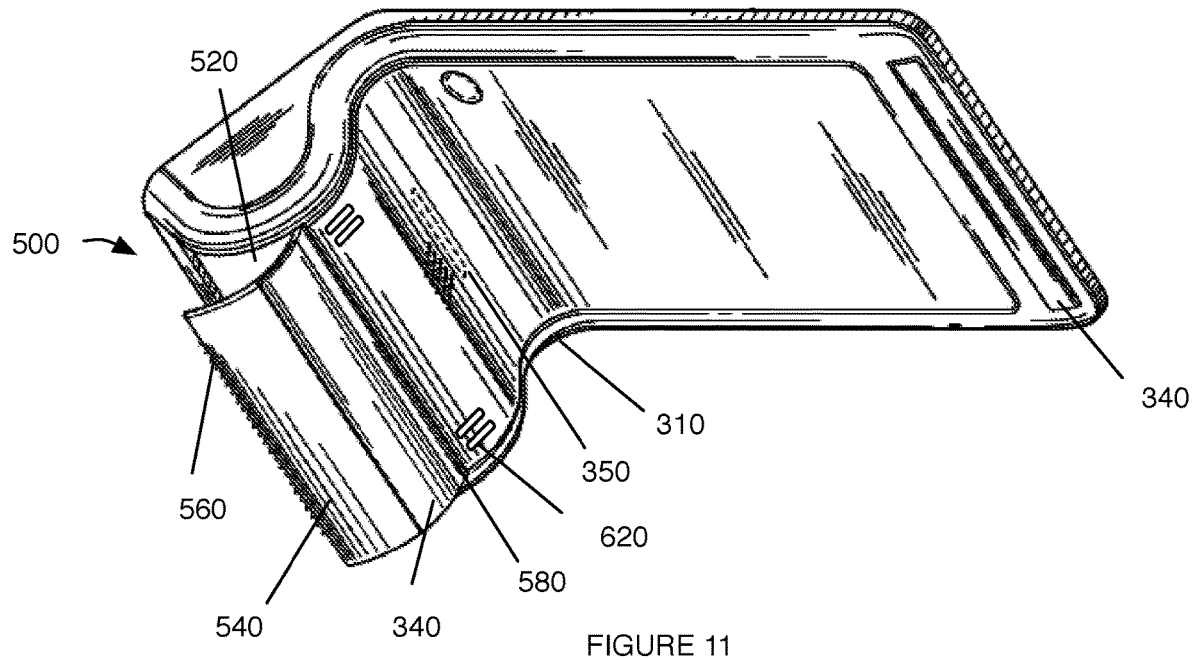
FIG. 11 is an isometric view of a variation of the payment terminal including a printer, wherein the printer door is in an open configuration.

The power source 600 can additionally include one or more charging contacts 620 that function to receive power from an outside source. The charging contacts 620 can additionally function to transfer information. For example, the payment terminal 1 can include a first set of high voltage charging contacts 620 and a second set of charging contacts 620, wherein the first and second set of charging contacts 620 can both be electrically connected to the power source 600. Examples of charging contacts 620 that can be used include power and data contacts (e.g., male or female connectors), exposed contacts, inductive charging coils, or any other suitable power and/or data transfer system. The charging contacts 620 can additionally or alternatively be directly connected to a payment terminal component. For example, the first set of charging contacts 620 can be arranged along the printer body 510 and be electrically connected to the printer 500, such that the printer 500 can be directly powered by the first set of charging contacts 620, as shown in FIG. 11, but can alternatively be arranged in any other suitable position. The second set of charging contacts 620 can additionally function to transfer information (e.g., be a power and data port, such as a USB port or FireWire port), and can be arranged proximal the main processor 110, preferably between the main processor 110 and power source 600 but alternatively in any other suitable location. However, the power source 600 can include any other suitable power connection. The charging contacts 620 are preferably arranged along the exterior of the payment terminal 1 (e.g., along the housing 300 body). The charging contacts 620 can be arranged proximal a contact surface 340, along a side of the terminal 1, or along any other suitable portion of the terminal 1. For example, the charging contacts 620 can be arranged distal the display connected to the printer 500, but can alternatively be arranged proximal the display. In one variation, the charging contacts 620 are arranged along the curved face of the printer door 540. However, the charging contacts 620 can be arranged along the printer body 510 or along any other suitable portion of the printer 500. In a second example, the charging contacts 620 can be arranged along an edge of the main display back surface, distal the junction 320 and proximal the respective contact surface 340. However, the charging contacts 620 can be arranged in any other suitable position.

Figure 3:
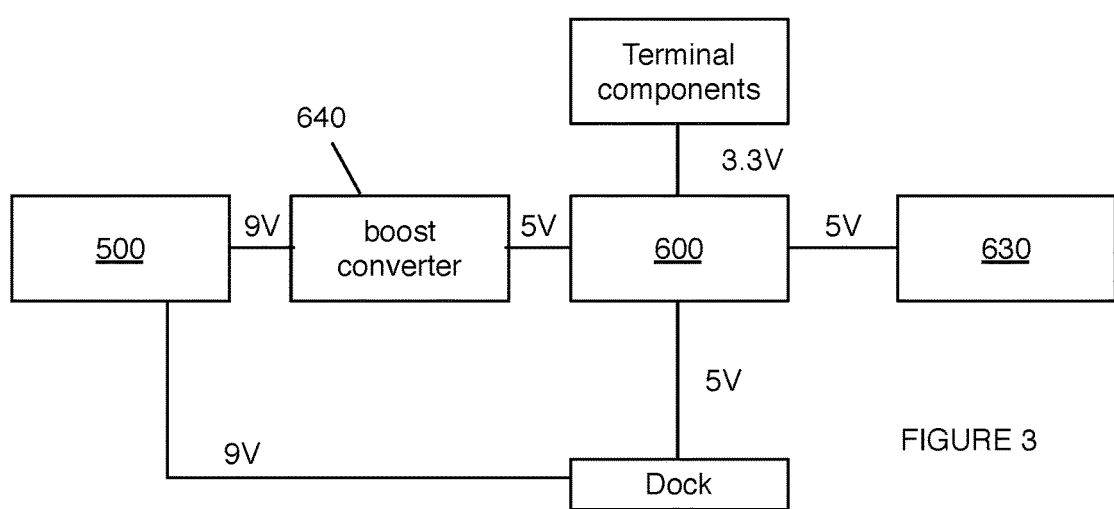
FIG. 3 is a power rail diagram of a specific example of the payment terminal.

The power source 600 can additionally include one or more power conversion circuits 640 that function to convert power source 600 power to power suitable for the component. In one variation, the power source 600 includes a boost converter (step-up converter) that functions to convert battery power (e.g., 5V, 3V, etc.) to printer power (e.g., 9V). In a specific example, as shown in FIG. 3, the first set of charging contacts 620, printer 500, and boost converter are connected to a first set of high voltage electrical rails, while the power source 600, second set of charging contacts 620, processors, displays, and inputs are connected to a second set of low voltage rails. The power source 600 can additionally be connected to the boost converter and/or a buck converter. However, the power circuitry can be connected in any other suitable manner.

The payment terminal 1 can additionally include a set of communication modules 190. Each communication module 190 is preferably controlled by the main processor no, but can alternatively be controlled by the secure processor 210 or by any other suitable processor. The communication modules 190 are preferably connected to the power source 600, but can alternatively be powered in any other suitable manner. The communication module 190 preferably functions to communicate with a peripheral or remote device (e.g., the remote system). For example, the communication module 190 can function to communicate data with the remote system, determine inventory based on inventory-associated signals, receive application or software updates, connect to peripheral devices 30 (e.g., printers 500, scanners, cash boxes, registers, etc.), user devices 2 (e.g., mobile devices), introduce connectivity to physically connected devices, and/or enable any other suitable functionality.

The communication module 190 can simultaneously communicate with multiple devices (e.g., with multiple channels), communicate with a single device (e.g., includes only a single channel), with networked application services, or communicate with any other suitable endpoint. The communication module 190 can additionally function as the payment hardware 250, but the payment hardware 250 can alternatively be a separate and distinct component. The communication module 190 is preferably a transceiver and enables two-way (e.g., data transmission and receipt), but can alternatively enable only one-way communication (e.g., only a transmitter capable of data transmission or only a receiver capable of data receipt). The communication modules 190 can be wired or wireless communication modules 190. The wired communication module 190 can be a USB module (e.g., connector and circuit board), FireWire module, Lightning module, and/or any other suitable connector module. The wireless communication module 190 can be a WiFi module, cellular module, satellite module, RF module, IR module, Zigbee module, Bluetooth module, NFC module, or any other suitable module. The wireless communication module 190 can additionally include one or more antennae. Each antenna can be arranged within the housing 300, along the surface of the housing 300, or arranged in any other suitable location. The antennae can extend along a portion of a display length, display width, printer 500 length, or along any other suitable portion of the payment terminal 1.

The housing 300 (casing) of the payment terminal 1 functions to mechanically protect and retain the payment terminal components. The housing 300 preferably substantially cooperatively encapsulates the processors, displays, printers 500, communication modules 190, sensors 400, and/or any other suitable payment terminal component with the secure input devices 230. However, the housing 300 can alternatively enclose any other suitable portion of the payment terminal components. The housing 300 is preferably formed from a polymer, but can alternatively be formed from metal or any other suitable material.

Figure 4:
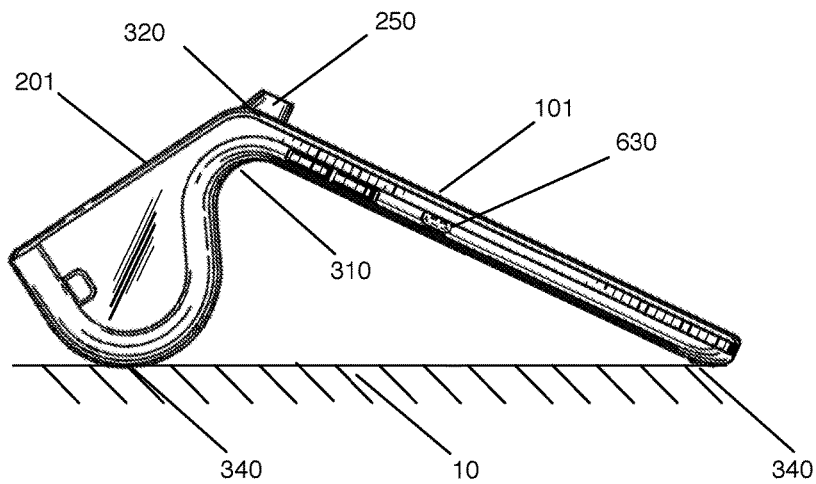
FIG. 4 is a side view representation of a variation of the payment terminal resting on a support surface.
Figure 5:
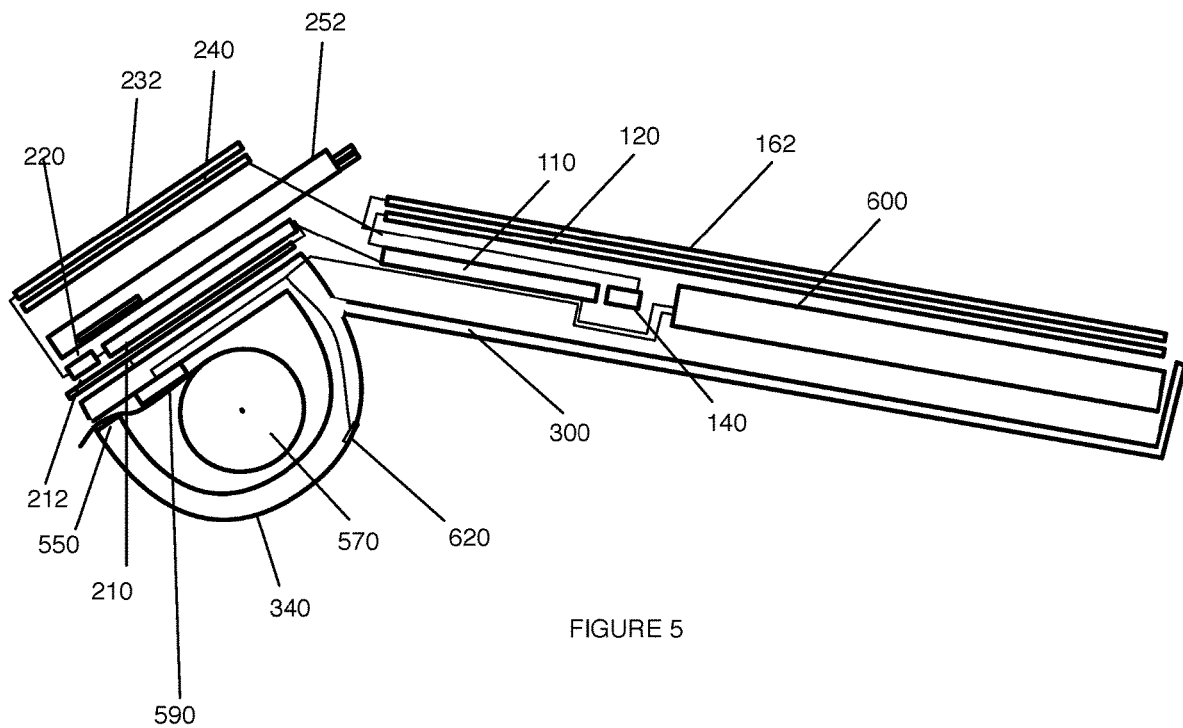
FIG. 5 is an exploded cutaway view of a variation of the payment terminal.

The housing 300 can additionally define a set of contact surfaces 340 that function to support the payment terminal 1 in a predetermined orientation relative to support surface (as shown in FIG. 4), such as a table. The contact surface 340 can be defined along an end of the display (e.g., a side of the display), a broad surface of the display, a portion of the printer body 510 (e.g., as discussed above), or along any other suitable portion of the payment terminal 1. The contact surface 340 is preferably substantially planar, but can alternatively be curved, angled, or have any other suitable configuration. The contact surface 340 can be substantially smooth, include a friction-increasing material (e.g., rubber or sandpaper), include traction features (e.g., protrusions, grooves, etc.), or include any other suitable surface.

The housing 300 can additionally include one or more drainage holes 350 that function to drain liquids from the housing interior. The drainage hole is preferably arranged along the interior angle of the junction, but can alternatively be arranged along the surface of the housing distal a display, along an end of the display, or along any other suitable surface. The drainage hole can be an ovular aperture through the housing thickness, a set of holes or grooves through the housing thickness, or have any other suitable configuration. The drainage hole can additionally include a mesh or any other suitable covering, which can function to prevent substance ingress into the drainage hole.

The payment terminal 1 can additionally include a handle or resting surface 310, which functions to provide a gripping surface or hand support such that a user can hold the payment terminal 1. The handle 310 can be a set of voids defined by the housing 300, a strap or movable piece coupled to the handle 310 (e.g., wherein the housing 300 can define a set of mounting points), or be defined in any other suitable manner. In a first specific example, the handle 310 can be cooperatively defined by the secure display 240, the main display 120, and the printer body 510, as discussed above.

The payment terminal 1 can additionally include a set of sensors 400 that function to measure payment terminal 1 parameters. The payment terminal 1 parameters can include ambient parameters (e.g., ambient temperature, pressure, light, sound, etc.), operational parameters (e.g., system temperature, power consumption, etc.), user parameters (e.g., biometric information, optical information, etc.), or any other suitable parameters. Each sensor is preferably controlled by and/or operatively connected to the main processor 110, but can alternatively be controlled by and/or operatively connected to the secure processor 210 or any other suitable processor. The set of sensors 400 can include light sensors (e.g., camera 430, ambient light sensor, etc.), sound sensors (e.g., microphones), motion sensors (e.g., accelerometer, gyroscope, etc.), location sensors (e.g., GPS, GSM, cellular triangulation, etc.), proximity sensors, biometric sensors (e.g., a fingerprint reader), or any other suitable sensor. The payment terminal 1 can additionally include additional visual outputs, audio outputs (e.g., speakers), or any other suitable output.

Figure 14:
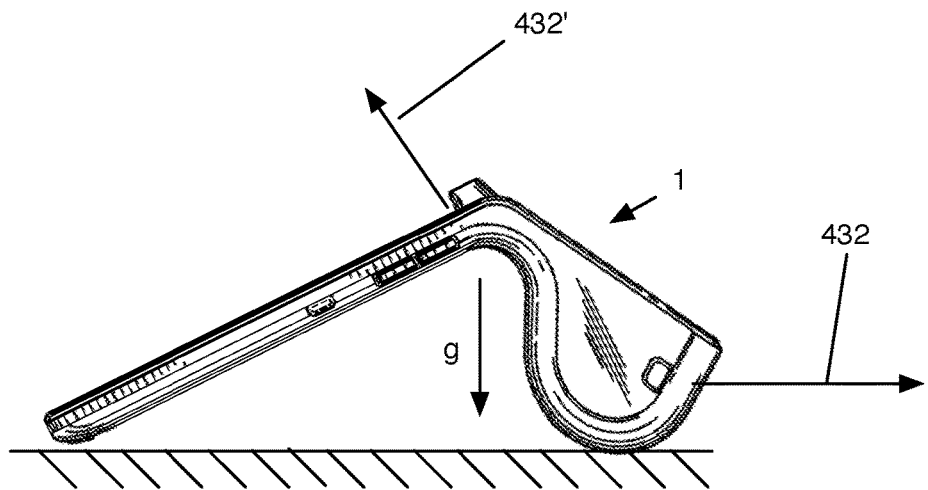
FIG. 14 is a schematic representation of a variation of the payment terminal including a first and second camera, and a position sensor.
Figure 15:
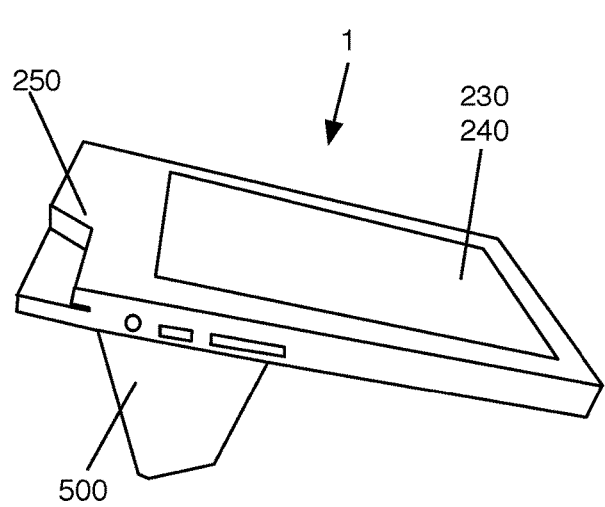
FIGS. 15-19 are schematic representations of different variations of the payment terminal.
Figure 16:
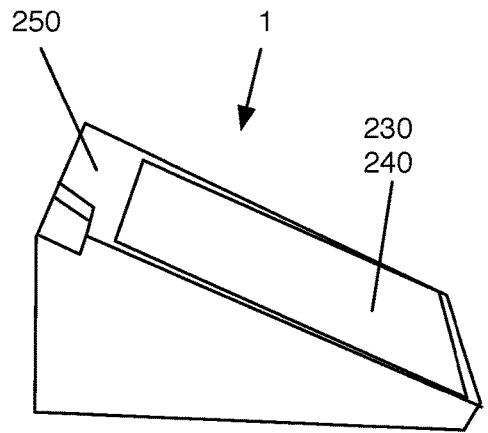
Figure 18:
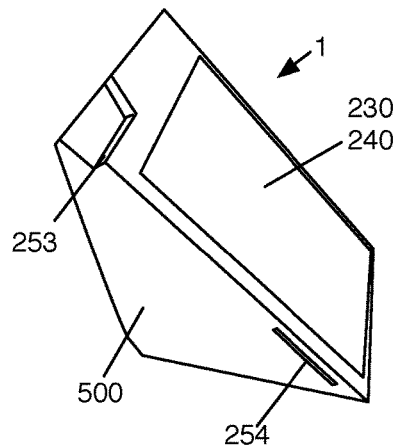
Figure 17:
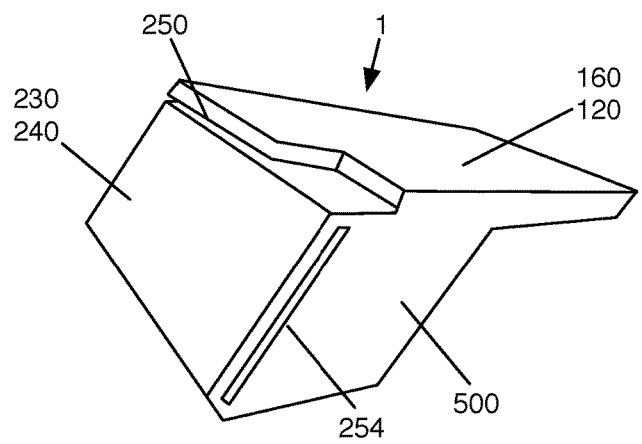
Figure 19:
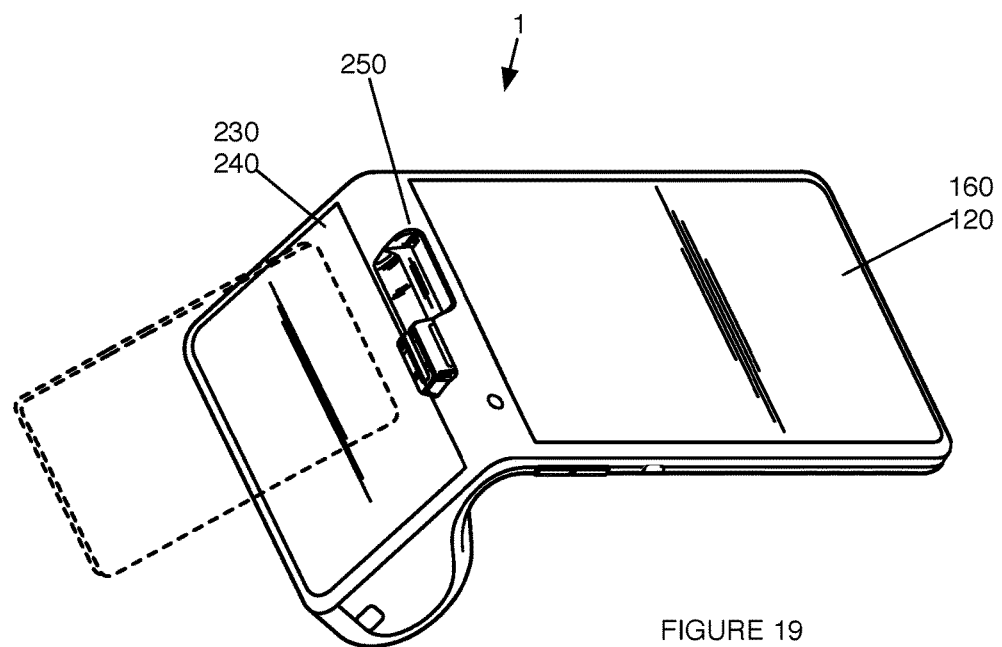

In one example, the payment terminal 1 includes a first and second camera. The first camera (customer camera) can be arranged proximal the secure display 240, and the second camera (merchant camera) can be arranged proximal the main display 120. In a specific example, the first camera can be arranged with a camera active surface normal vector at a non-zero angle to the secure display active surface normal vector. More preferably, the first camera can be arranged with an active surface normal vector 432 directed substantially perpendicular a contact surface broad face, as shown in FIG. 14. However, the first camera can be otherwise arranged. The second camera is preferably arranged with an active surface normal vector 432' parallel the main display active surface normal vector, but can be otherwise arranged. Both the first and second cameras can be operatively connected to the main processor 110, such that the main processor 110 receives the optical output from both cameras. The main processor 110 can display the optical output of the first camera on the secure display 240, and can display the optical output of the second camera on the main display 120. The main processor 110 can additionally process the optical outputs of the first and/or second camera to identify items (e.g., QR codes, barcodes, etc.).

In a second example, the payment terminal operation mode can be determined based on the sensor measurements. The payment terminal 1 can be operable between a desktop mode and mobile mode. The payment terminal 1 can be operable in the desktop mode when coupled to a dock (e.g., a charging dock), when the payment terminal 1 is resting with an imaginary support plane extending between a first and second support point on the terminal 1 substantially perpendicular to a gravity vector, when the first and second support point on the terminal 1 are simultaneously coupled to a surface, or in response to any other suitable event indicative of payment terminal 1 coupling to a surface. The payment terminal 1 can be operable in the mobile mode when an on-board motion sensor (e.g., accelerometer, gyroscope, etc.) measures movement above a predetermined jerk, acceleration, or velocity, when the first and second support points are not simultaneously coupled to a surface, when a third support point (e.g., in a handle 310) is coupled to a surface, or in response to any other suitable event indicative of payment terminal 1 usage in a handheld or mobile application. The payment terminal 1 can have the same or different functionalities when in the desktop mode or mobile mode. In one example of the latter variation, the payment terminal 1 can selectively enable a first set of applications and disable a second set of applications or functionalities (e.g., camera, functionalities, etc.) when in the desktop mode, and selectively enable the second set of applications and enable the first set of applications or functionalities when in the mobile mode.

Figure 10:
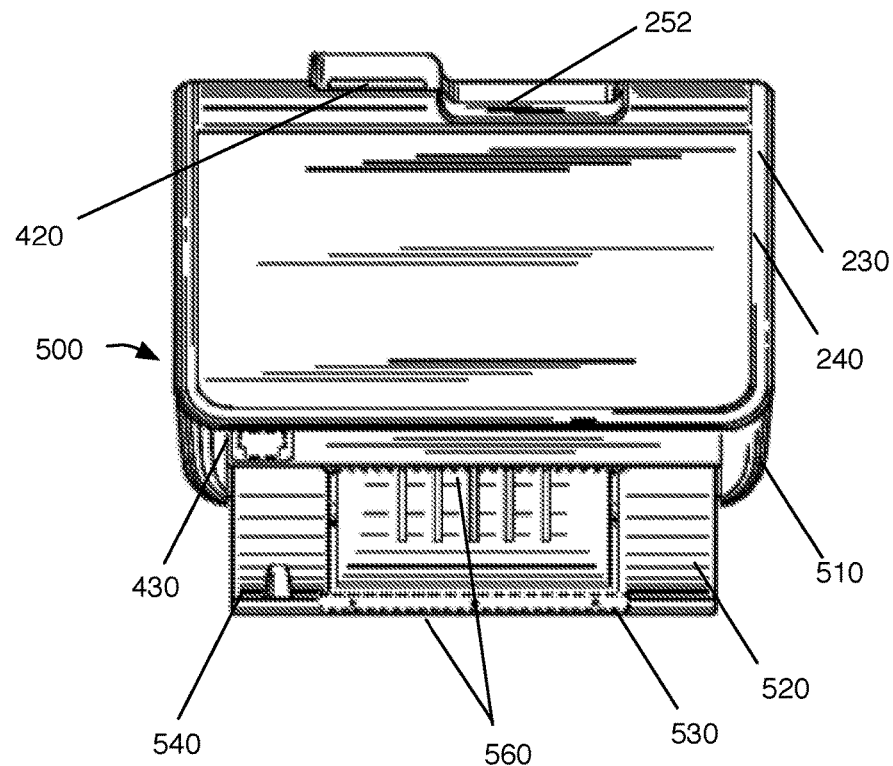
FIG. 10 is an end on view of a variation of the payment terminal including a printer, wherein the printer door is in an open configuration.

As shown in FIG. 10, the payment terminal 1 can additionally include a set of indicators 420 that function to indicate an interaction status. Examples of interaction statuses that can be indicated include card insertion status (e.g., successful card insertion, failed card insertion, etc.), payment entry status, user prompts (e.g., for required user actions), merchant prompts, or any other suitable interaction status. The indicator can be a set of light emitting elements (e.g., a first and second light emitting element), an audio output, a user interface element (e.g., an icon, etc.), or any other suitable indicator. One or more indicators of the set of indicators can be controlled by the main processor no, the secure processor 210, the payment hardware 250, or any other suitable component. In one example, the hybrid card reader 252 can include a set of light emitting elements (e.g., LEDs, OLEDs, etc.) triggered by the switch (e.g., through the secure processor). In a specific example, the light emitting elements emit light having a first frequency in response to switch operation in the coupled mode, and emit light having a second frequency in response to switch operation in the uncoupled mode. The light emitting elements can be arranged along a protrusion of the hybrid card reader 252, wherein the protrusion can additionally house the magstripe reader 253. However, the indicators can be arranged in any other suitable location.

The payment terminal 1 can additionally include a security mesh 212 that functions to detect tampering. The security mesh 212 is preferably connected to the secure processor, but can alternatively or additionally be connected to the main processor or any other suitable processing system. The security mesh is preferably arranged along the interface between the printer body and the secure processor (e.g., wherein the card reader body is metallic and coupled to the secure display), but can alternatively be arranged about the secure processor, around the IC chip reader, arranged between the secure display and secure processor, arranged along the junction, or arranged along any other suitable portion of the payment terminal 1. The security mesh can have adjacent ground and power wires (e.g., wherein the ground and power wires are arranged in a single plane in a boustrophedonic pattern), interwoven ground and power wires, or any other suitable security mesh.

4. Specific Examples

Figure 2:
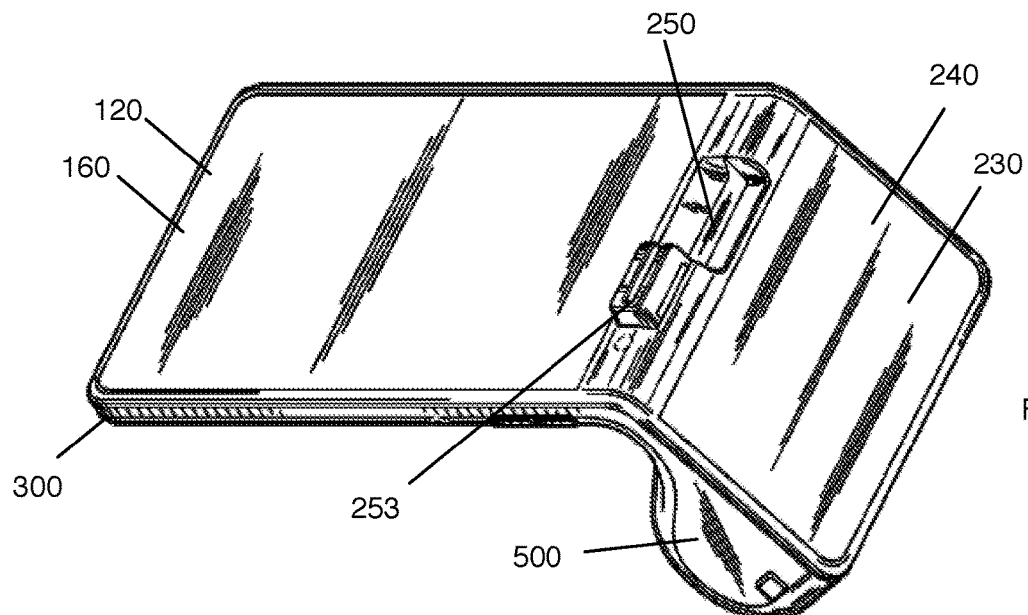
FIG. 2 is an isometric view of a variation of the payment terminal.

In a first example of the payment terminal 1, as shown in FIG. 2, the payment terminal 1 includes a main display 120, a main input device 160, a main processor 110, a main input processor 140, a secure display 240, a secure input device 230, a secure processor 210, a secure input processor 220, and a power source 600. The main input device 160 is only connected to the main input processor 140 and the power source 600, directly or indirectly through the main input processor. The remainder of the components can be directly connected to the power source 600 or indirectly connected to the power source 600 through an intermediary processor. The secure input device 230 is only connected to the secure input processor 220 and the power source 600, directly or indirectly through the input processor. The main processor 110 is connected to and receives data from the main input processor 140 and secure input processor 220. The main processor 110 is connected to and sends data to the main display 120 and secure display 240. The secure processor 210 is connected to and receives data from the secure input processor 220. The secure processor 210 is connected to the main processor 110 by a wired connection 800, wherein the wired connection is preferably the only connection between the secure processor 210 and main processor 110. The connection Boo is preferably a one way connection, such that the secure processor 210 preferably is capable of only sending data 202 to the main processor 110 over the connection 800, but can alternatively or additionally be a two way connection such that the secure processor 210 can receive data from the main processor 110. However, the processors can be otherwise connected. The secure processor 210 is operable between a secured and unsecured mode, wherein the secure processor 210 does not forward unsecured input coordinates to the main processor in the secured mode, and forwards unsecured input coordinates received from the secure input processor to the main processor 110 in the unsecured mode. The secure processor, in the secured mode, can send events descriptive of user interactions to the main processor (e.g., key pressed, user cancelled, user deleted key, etc.). The payment terminal 1 can additionally include a hybrid card reader 252, wherein the hybrid card reader 252 is only connected to and configured to send information to the secure processor 210. The hybrid card reader 252 can additionally be connected to the power source boo, indirectly or directly. The payment terminal 1 can additionally include a printer 500, wherein the printer 500 is connected to and controlled by the main processor 110. The payment terminal 1 can additionally include a set of sensors 400, such as cameras, wherein the sensors 400 are connected to and send information to the main processor no.

The main input device 160 and secure input device 230 are both touchscreens and overlaid over the main display 120 and secure display 240, respectively. The main display 120 and the secure display 240 are both LCD displays. The main display 120 is larger than the secure display 240. In a specific example, the main display 120 length can be two times the width of the secure display 240, wherein the main display 120 width can be substantially equal to the secure display length. The main display 120 and secure display 240 can be joined along a junction 320 formed by the housing 300, forming a secure side 201 including the secure display 240, secure input device 230, secure input processor 220, and secure processor 210, and a main side 101 including the main display 120, main input device 160, main input processor 140, and main processor 110. The wired connection extends across the junction 320. In a specific example, a lateral edge of the main display 120 is joined to a longitudinal edge of the secure display 240. The hybrid card reader 252 is arranged along the junction 320, with the opening extending along the junction 320 and the card reader body extending parallel the secure display 240. The power source 600 (e.g., battery) is arranged parallel the main display 120 proximal the main display back surface, proximal the end of the main display 120 distal the junction 320 (distal main display end). The main processor 110 is arranged between the power source boo and the junction 320. The printer 500 is arranged along a portion of the secure display back surface. In a specific example, the printer 500 is arranged along an end of the secure display back surface distal the junction 320 (distal secure display end). The gap of the printer 500 is oriented to be substantially parallel with the distal secure display end. The gap includes toothed separation mechanisms 560 along both longitudinal edges of the gap. The printer door 540 is arranged distal the secure display back surface, with the hinge 580 distal the distal secure display end, such that the printer door 540 opens away from the secure display 240. The housing 300 preferably traces the surfaces of the printer body 510, remainder of the secure display back face, and main display 120 to cooperatively form a handle 310. The weight of the printer 500 preferably counterbalances the weight of the power source 600. A first contact surface 340 is defined along the distal main display end) and a second contact surface 340 is defined along a longitudinal, arcuate surface of the printer 500 (e.g., along the printer body 510 or the printer door 540). A first camera is arranged along the side of the secure display 240, proximal the distal secure display end, and is oriented with the camera active surface normal vector substantially perpendicular the second contact surface normal vector (e.g., perpendicular a gravity vector). The payment terminal 1 can additionally include a power and data connector arranged between the processor and power source 600, along a longitudinal side of the main display 120. The payment terminal 1 can additionally include a set of docking connectors arranged along an arcuate surface of the printer body 510, configured to connect to an external dock. The power and data connector and docking connectors are connected to the power source 600. The payment terminal 1 can additionally include a WiFi transceiver configured to communicate with a remote device, an NFC transceiver, a Bluetooth transceiver, a beacon transceiver, or any other suitable communication mechanism. The short-range communication modules (e.g., NFC, Bluetooth, beacon, etc.) that function as payment hardware are connected to the secure processor 210. The long-range communication modules are connected to the main processor 110.

In a second example, the payment terminal 1 includes a single display (secure display 240) and a single input device (secure input device 230), a main processor 110, a secure processor 210, a secure input processor 220, a power source 600, and a set of payment hardware 250 (e.g., short-range communication modules, card reader, etc.). The single input device is only connected to and sends information to the secure input processor 220. The secure input processor 220 is connected to and sends information to the main processor 110 and the secure processor 210. The main processor 110 is connected to the secure input processor 220, the power source 600, and the display. The secure processor 210 is only connected to the power source 600, the payment hardware 250, the main processor 110, and the secure input processor 220. The secure processor 210 is connected to the main processor 110 by a power and data cable. The secure input processor 220 is operable between a secured mode, wherein information is sent to the secure processor 210, and an unsecured mode, wherein information is sent to the main processor no. The secure input processor 220 switches between the secured and unsecured mode in response to a switching event. The switch event can be the initiation of a payment flow (e.g., in response to selection of a "charge"

icon), the receipt of financial transaction information from the payment hardware 250, the detected position of the payment terminal 1, or any other suitable event. In a first specific example, the payment terminal 1 can operate in the unsecured mode in response to the accelerometer indicating a first terminal orientation, and in a secured mode in response to the accelerometer indicating a second terminal orientation (e.g., opposing the first orientation). In a second specific example, the payment terminal 1 can operate in the unsecured mode in response to a switch operating in a first position, and in the secured mode in response to the switch operating in a second position. The switch is preferably switched from the first to the second position when the terminal 1 is rotated about a rotational axis substantially normal to a terminal contact surface 340.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A system, comprising:
   a terminal, comprising:
      a housing comprises a first portion and a second portion;
      a payment card industry (PCI)-compliant secure processing system disposed in the housing;
      a touchscreen connected to the secure processing system and connected to the first portion of the housing, wherein the touchscreen is configured to receive an input from a first user;
      a payment instrument reader connected to the secure processing system in the housing;
      a main processing system separate from and connected to the secure processing system, the main processing system disposed in the housing; and
      a display connected to the second portion of the housing and operably connected to the main processing system, the display configured to display information to a second user;
      wherein the first portion of the housing is disposed at a suitable angle relative to the second portion of the housing such that the touchscreen is compliant with a PIN transaction security (PTS) requirement; and
   a remote server,
      wherein the remote server is in communication with the terminal,
      wherein the remote server is configured to receive a first information transmitted by the main processing system of the terminal, and
      wherein the remote server is configured to instruct to display a second information on the display of the terminal.

2. The system of claim 1, wherein the display is operably connected to only the main processing system.

3. The system of claim 2, wherein the touchscreen is operably connected to only the secure processing system.

4. The system of claim 1, wherein the payment instrument reader includes an NFC transceiver configured to facilitate NFC payment information transfer between an NFC payment instrument and the secure processing system.

5. The system of claim 1, wherein the payment instrument reader includes an integrated circuit (IC) chip reader for reading EMV cards.

6. The system of claim 1, wherein the payment instrument reader includes:
   an NFC transceiver configured to facilitate NFC payment information transfer between an NFC payment instrument and the secure processing system; and
   an integrated circuit (IC) chip reader for reading EMV cards.

7. The system of claim 1, wherein the main processing system is configured to execute third party applications.

8. The system of claim 7, wherein the main processing system is configured to control the display to display application data of at least one application executed by the main processing system.

9. The system of claim 1, wherein the secure processing system is limited to execution of a predetermined set of certified modules.

10. The system of claim 9, wherein the predetermined set of certified modules includes a certified payment module.

11. The system of claim 9, wherein the secure processing system is configured to provide user input received via the touchscreen to an application executed by the main processing system.

12. The system of claim 9, wherein the secure processing system is configured to generate data from user input received via the touchscreen, and provide the generated data to an application executed by the main processing system.

13. The system of claim 12, wherein the user input is user input for a PIN number.

14. The system of claim 12, wherein the generated data is encrypted data.

15. The system of claim 1, wherein the main processor is non-payment card industry (PCI)-compliant.

16. A method, comprising:
   obtaining a terminal, the terminal comprising
      a housing comprises a first portion and a second portion,
      a payment card industry (PCI)-compliant secure processor disposed in the housing,
      a touchscreen connected to the secure processor and connected to the first portion of the housing,
         wherein the touchscreen is configured to receive an input from a first user,
      a payment instrument reader connected to the secure processor in the housing,
      a main processor separate from and connected to the secure processor, the main processor disposed in the housing,
      a display connected to the second portion of the housing and operably connected to the main processing system, the display configured to display information to a second user,
         wherein the first portion of the housing is disposed at a suitable angle relative to the second portion of the housing such that the touchscreen is compliant with a PIN transaction security (PTS) requirement;
   obtaining a remote server,
      wherein the remote server is in communication with the terminal;
   reading payment information with the payment instrument reader of the terminal;
   responsive to reading payment information, receiving the input from the first user via the touchscreen of the terminal;

providing data to the main processing system of the terminal, based on the input from the first user;

transmitting a first information from the main processing system of the terminal, based on the input from the first user, to the remote server; and displaying a second information, in response to the data provided to the main processing system of the terminal, on the display of the terminal.

17. The method of claim 16, wherein the payment instrument reader includes at least one of an NFC transceiver and an integrated circuit (IC) chip reader.

18. The method of claim 16, wherein the display is operably connected to only the main processing system.

19. The method of claim 18, wherein the touchscreen is operably connected to only the secure processing system.

20. The method of claim 16, wherein the main processor is non-payment card industry (PCI)-compliant.

* * * * *